United States Patent
Sullivan

(10) Patent No.: US 9,600,900 B2
(45) Date of Patent: Mar. 21, 2017

(54) SYSTEMS TO MEASURE YAW, SPIN AND MUZZLE VELOCITY OF PROJECTILES, IMPROVE FIRE CONTROL FIDELITY, AND REDUCE SHOT-TO-SHOT DISPERSION IN BOTH CONVENTIONAL AND AIR-BURSTING PROGRAMMABLE PROJECTILES

(71) Applicant: KMS CONSULTING, LLC, Kennebunk, ME (US)

(72) Inventor: Kevin Michael Sullivan, Kennebunk, ME (US)

(73) Assignee: NOSTROMO HOLDINGS, LLC, Alexandria, VA (US)

( * ) Notice: Subject to any disclaimer, the term of this patent is extended or adjusted under 35 U.S.C. 154(b) by 0 days.

(21) Appl. No.: 14/829,839

(22) Filed: Aug. 19, 2015

(65) Prior Publication Data

US 2016/0055652 A1    Feb. 25, 2016

Related U.S. Application Data

(63) Continuation-in-part of application No. 14/227,054, filed on Mar. 27, 2014.

(Continued)

(51) Int. Cl.
   *G06F 19/00*  (2011.01)
   *G06T 7/20*   (2017.01)
   (Continued)

(52) U.S. Cl.
   CPC ............ *G06T 7/2033* (2013.01); *F42B 10/32* (2013.01); *F42B 12/02* (2013.01); *F42B 12/72* (2013.01);
   (Continued)

(58) Field of Classification Search
   CPC ... F41J 5/06; G05B 19/00; G06G 7/80; G06G 7/32; F41G 3/06
   (Continued)

(56) References Cited

U.S. PATENT DOCUMENTS

| 3,019,073 A | 1/1959 | Hall |
| 3,633,212 A | 1/1972 | Cooper |

(Continued)

FOREIGN PATENT DOCUMENTS

| CA | 2082448 C | 4/2002 |
| DE | 3603521 A1 | 8/1987 |

(Continued)

*Primary Examiner* — Karl D Frech
(74) *Attorney, Agent, or Firm* — Karl F. Milde, Jr.; Eckert Seamans Cherin & Mellott, LLC

(57) ABSTRACT

Systems to measure muzzle exit conditions of for ammunition improve fire control solutions and reduce shot-to-shot dispersion in both conventional and air-burst programmable ammunition. A first system measures muzzle velocity and, when firing "post-shot" programmable ammunition, the system calculates a unique time-of-flight optimized for the actual muzzle velocity and transmits the time to detonate signal by using either optically or radio-frequency signals that represent an optimized time of burst to a projectile. A second system measures muzzle velocity coupled to a ballistic calculator and, when used with ammunition having ferrous characteristics, the force is applied to exiting ammunition to slow or increase the muzzle velocity to a consistent, standardized target velocity. The systems are separately or in combination incorporated into kits that readily improve the performance of weapon systems.

23 Claims, 37 Drawing Sheets

Related U.S. Application Data

(60) Provisional application No. 61/805,534, filed on Mar. 27, 2013.

(51) Int. Cl.

| | | |
|---|---|---|
| *F42B 12/02* | (2006.01) | |
| *H04N 5/225* | (2006.01) | |
| *F42B 10/32* | (2006.01) | |
| *F42B 12/72* | (2006.01) | |
| *F42C 17/00* | (2006.01) | |

(52) U.S. Cl.
CPC ........... *F42C 17/00* (2013.01); *H04N 5/2256* (2013.01); *G06T 2207/10152* (2013.01)

(58) Field of Classification Search
USPC ........................................ 235/404, 400, 417
See application file for complete search history.

(56) References Cited

U.S. PATENT DOCUMENTS

| | | |
|---|---|---|
| 3,659,201 A | 4/1972 | Vogelsang |
| 4,228,397 A | 10/1980 | Schmidt |
| 4,342,961 A | 8/1982 | Zimmermann et al. |
| 4,483,190 A | 11/1984 | Cornett |
| 4,486,710 A | 12/1984 | Schmidt |
| 4,524,323 A | 6/1985 | Schmidt |
| 4,677,376 A * | 6/1987 | Ettel ....................... G01P 3/665 324/179 |
| 4,818,104 A | 4/1989 | Hartman |
| 4,864,515 A | 9/1989 | Deck |
| 4,928,523 A | 5/1990 | Muhrer et al. |
| 5,026,158 A * | 6/1991 | Golubic .................... F41G 1/38 356/252 |
| 5,159,396 A | 10/1992 | Yuhas |
| 5,233,901 A | 8/1993 | Nilsson et al. |
| 5,267,502 A | 12/1993 | Gent et al. |
| 5,685,504 A | 11/1997 | Schneider et al. |
| 5,827,958 A | 10/1998 | Sigler |
| 6,615,739 B2 | 9/2003 | Gibson et al. |
| 6,644,111 B2 | 11/2003 | Cytron et al. |
| 6,666,089 B2 | 12/2003 | Dilz, Jr. |
| 6,752,137 B2 | 6/2004 | Brunette et al. |
| 6,898,971 B2 | 5/2005 | Dilz, Jr. |
| 8,305,071 B2 | 11/2012 | Frick |
| 2005/0241203 A1* | 11/2005 | Lizotte .................... F41A 21/12 42/1.01 |
| 2009/0289619 A1 | 11/2009 | Frick |
| 2011/0297742 A1 | 12/2011 | Sullivan et al. |
| 2012/0085162 A1 | 4/2012 | Furch et al. |
| 2012/0125092 A1 | 5/2012 | Downing |

FOREIGN PATENT DOCUMENTS

| | | |
|---|---|---|
| DE | 19719977 C1 | 10/1998 |
| EP | 0108973 B1 | 1/1987 |
| WO | 2008048116 A1 | 4/2008 |
| WO | 2010108917 A1 | 9/2010 |
| WO | 2012131548 A1 | 10/2012 |

\* cited by examiner

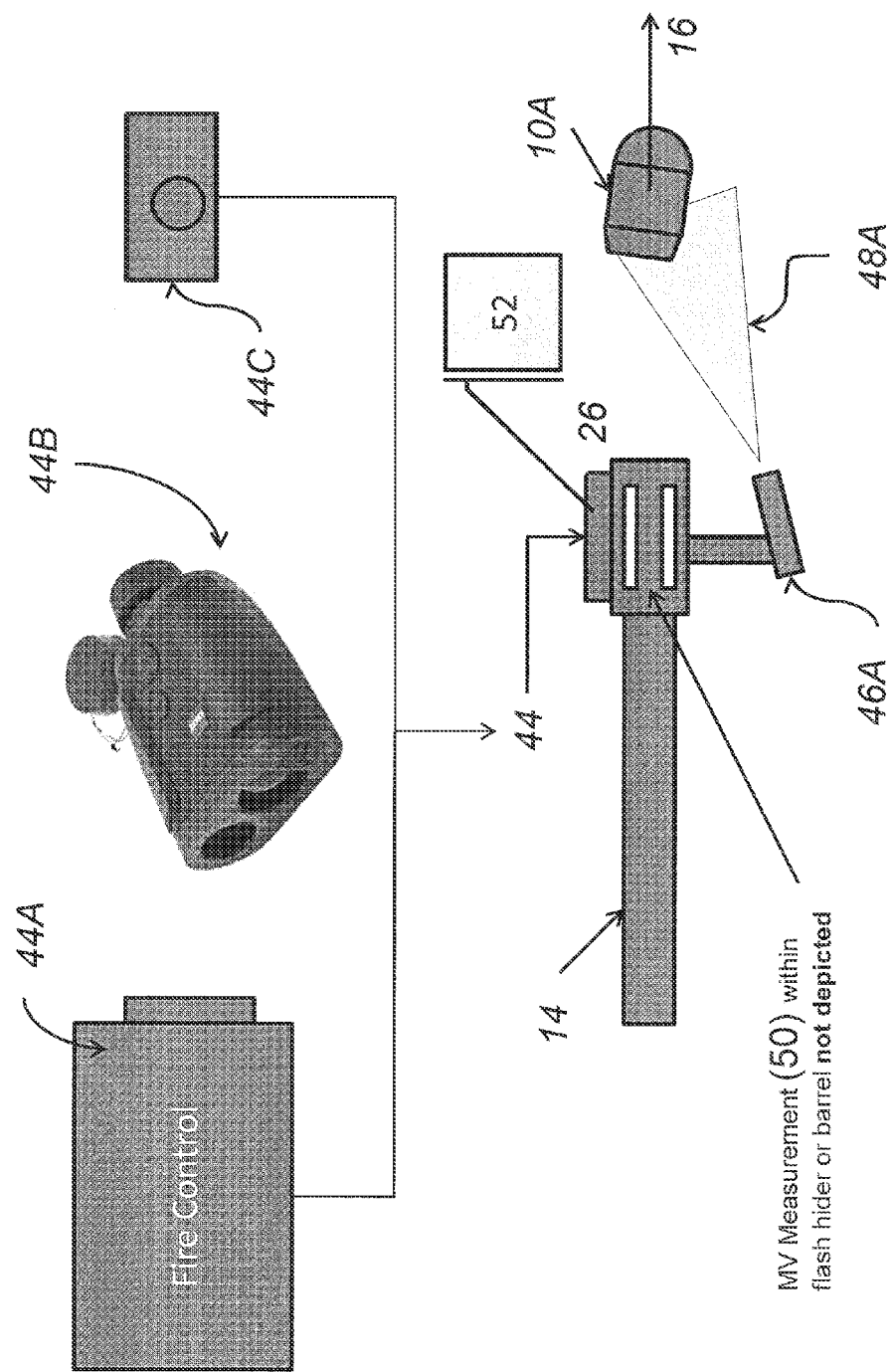
Figure 18 A – Simplified Kit Diagram
(optical transmission of flight time or time to detonate program)

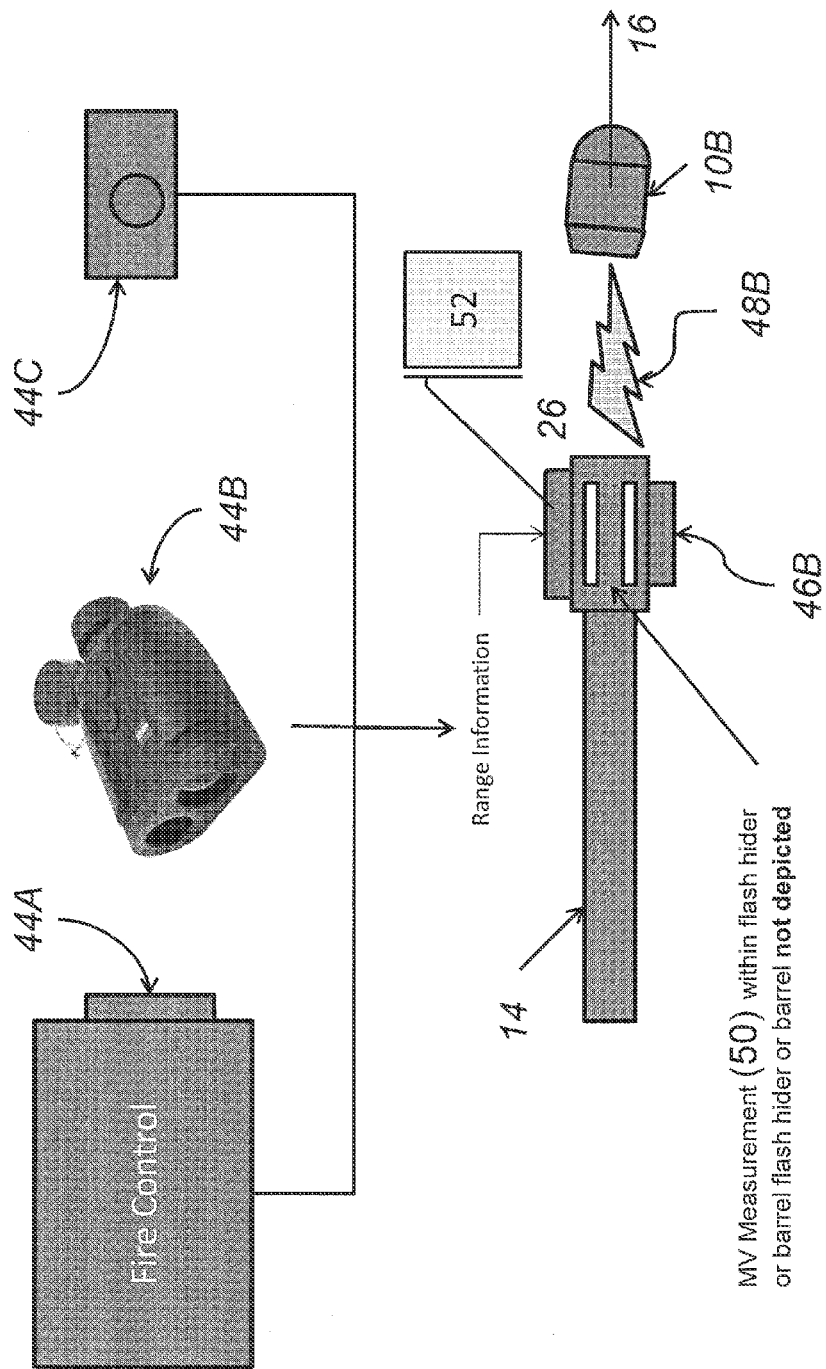
Figure 18 B – Simplified Kit Diagram
(RF transmission of flight time or time to detonate program)

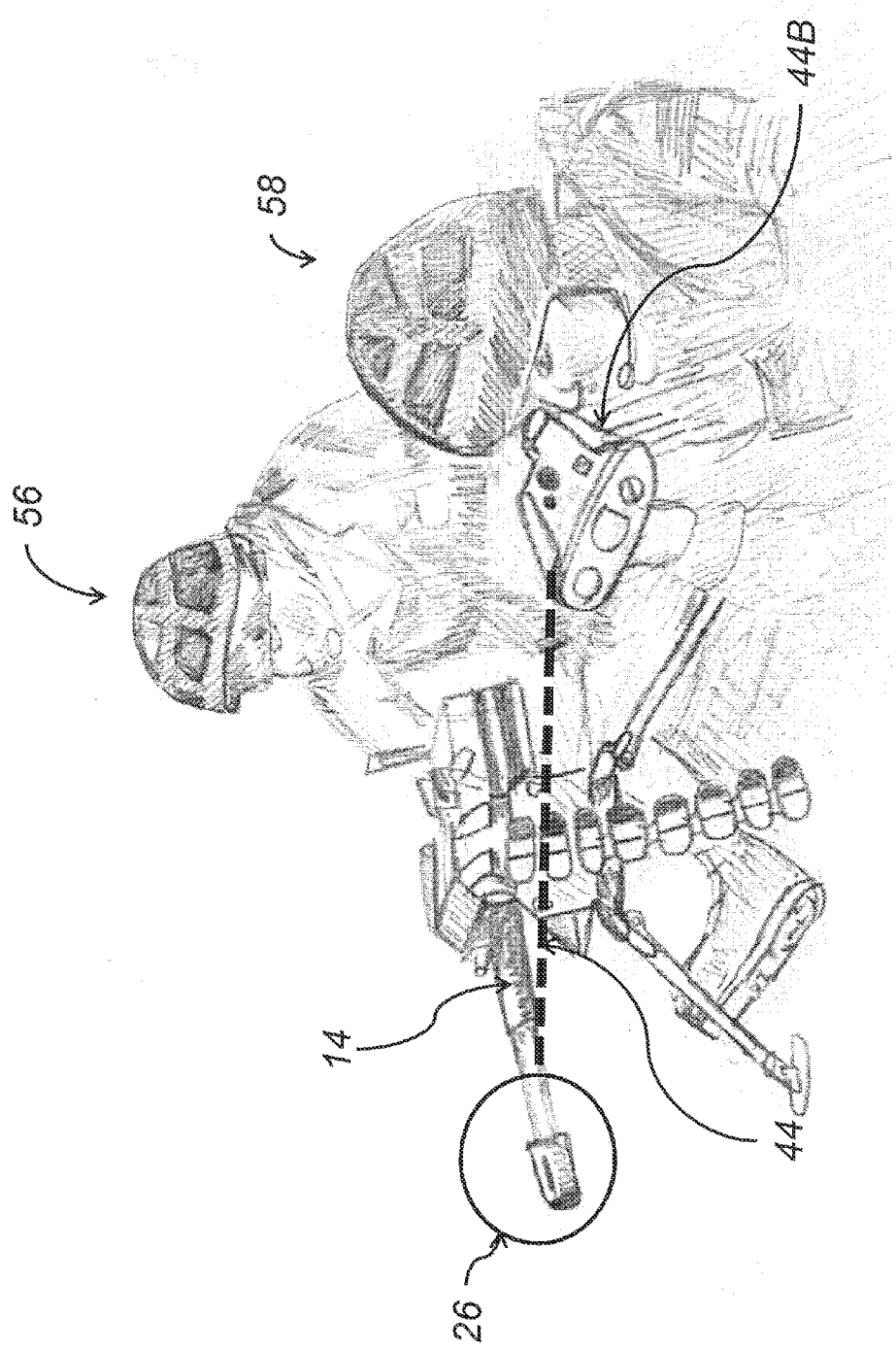
Figure 18 C – Simplified Kit Diagram with Hand Held Laser Range Finder
(wireless or tethered signal for a laser range finder to a measurement and ammunition programming unit).

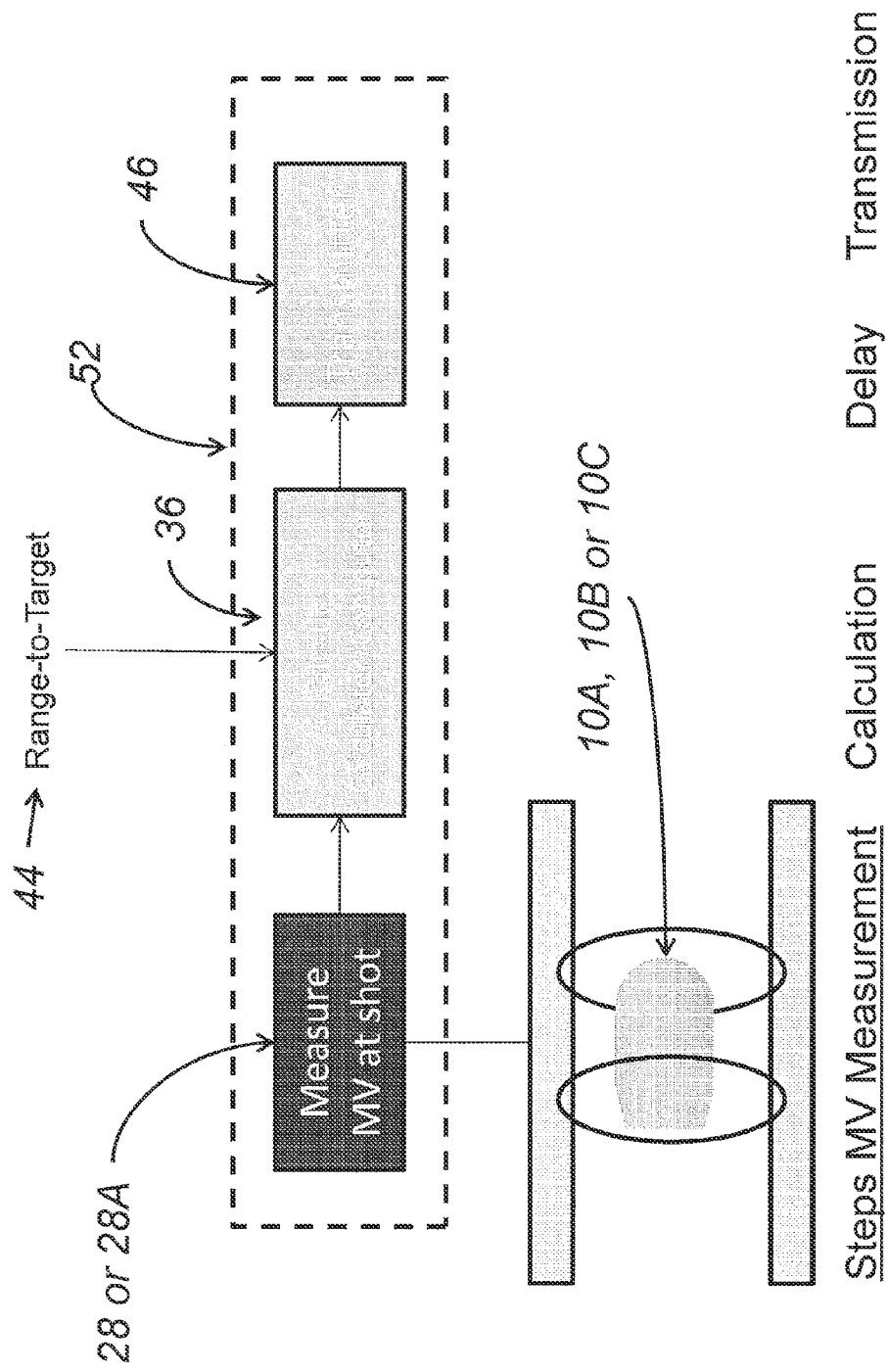
Figure 19 A – Methodology to measure a projectile transiting a barrel - Measurement (and transmit an optical or RF signal to a post shot programmable projectile).

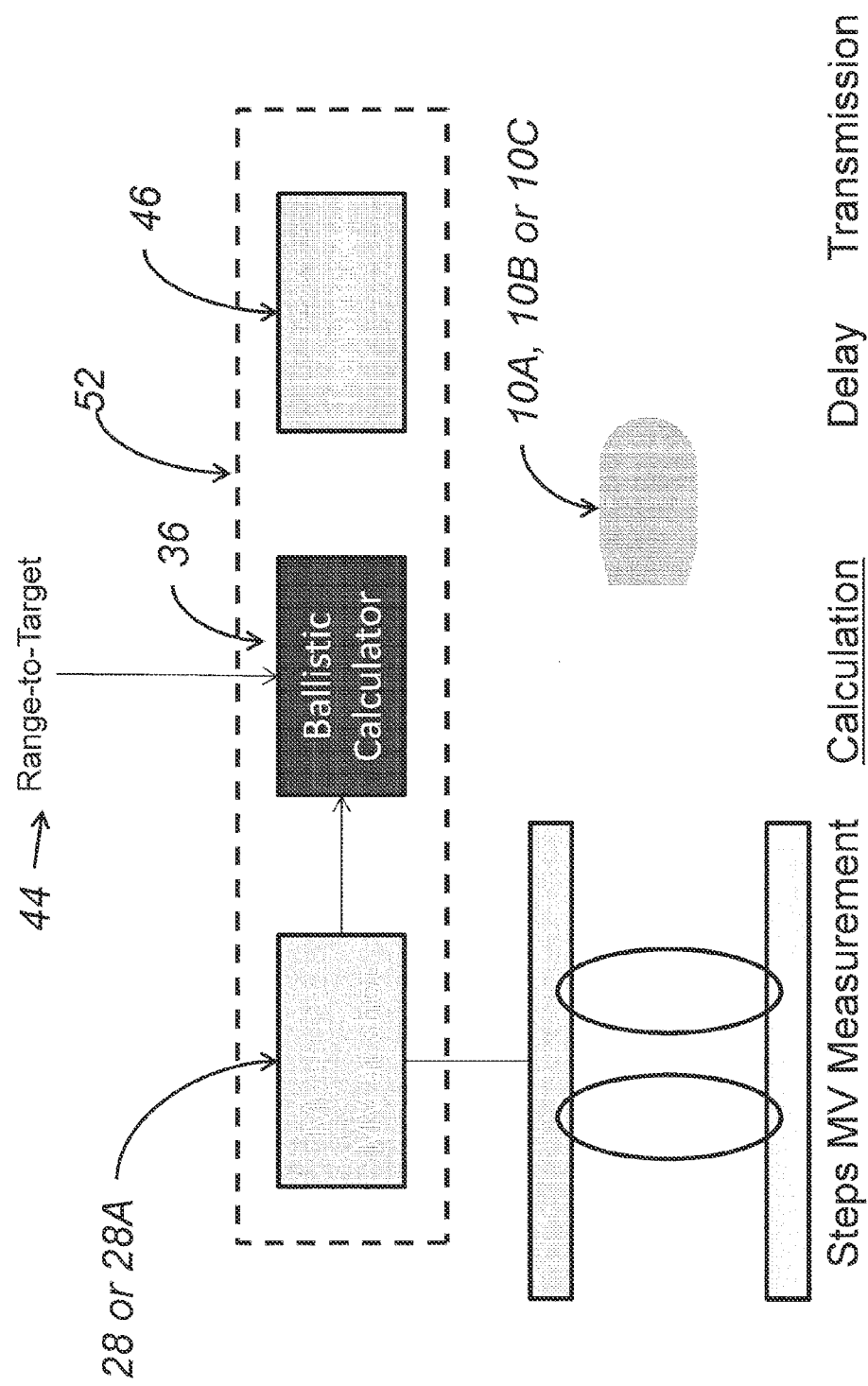
Figure 19 B – Methodology to measure a projectile transiting a barrel - Calculation (and transmit an optical or RF signal to a post shot programmable projectile).

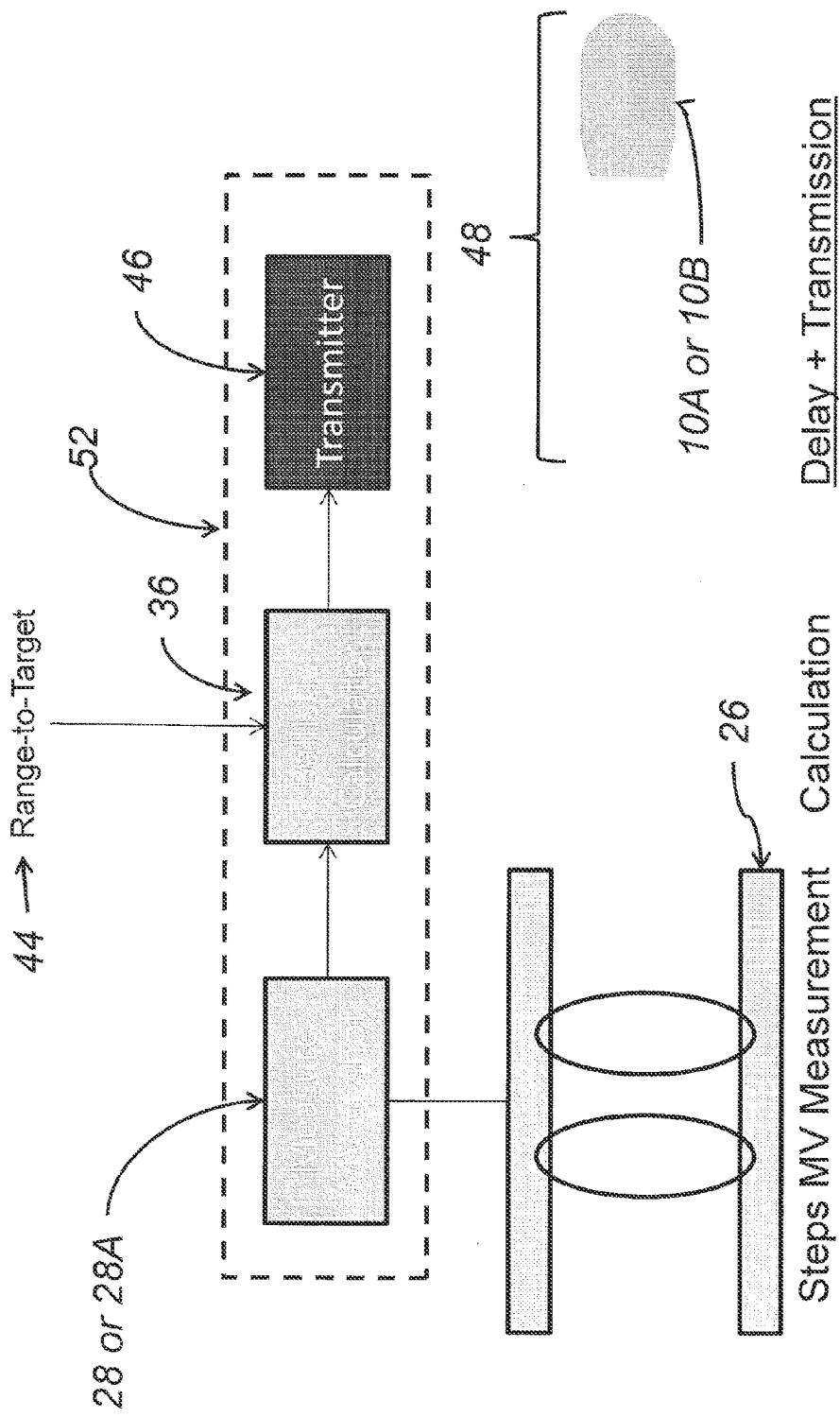
Figure 19 C – Methodology to measure a projectile transiting a barrel – Delayed Transmission (and transmit an optical or RF signal to a post shot programmable projectile).

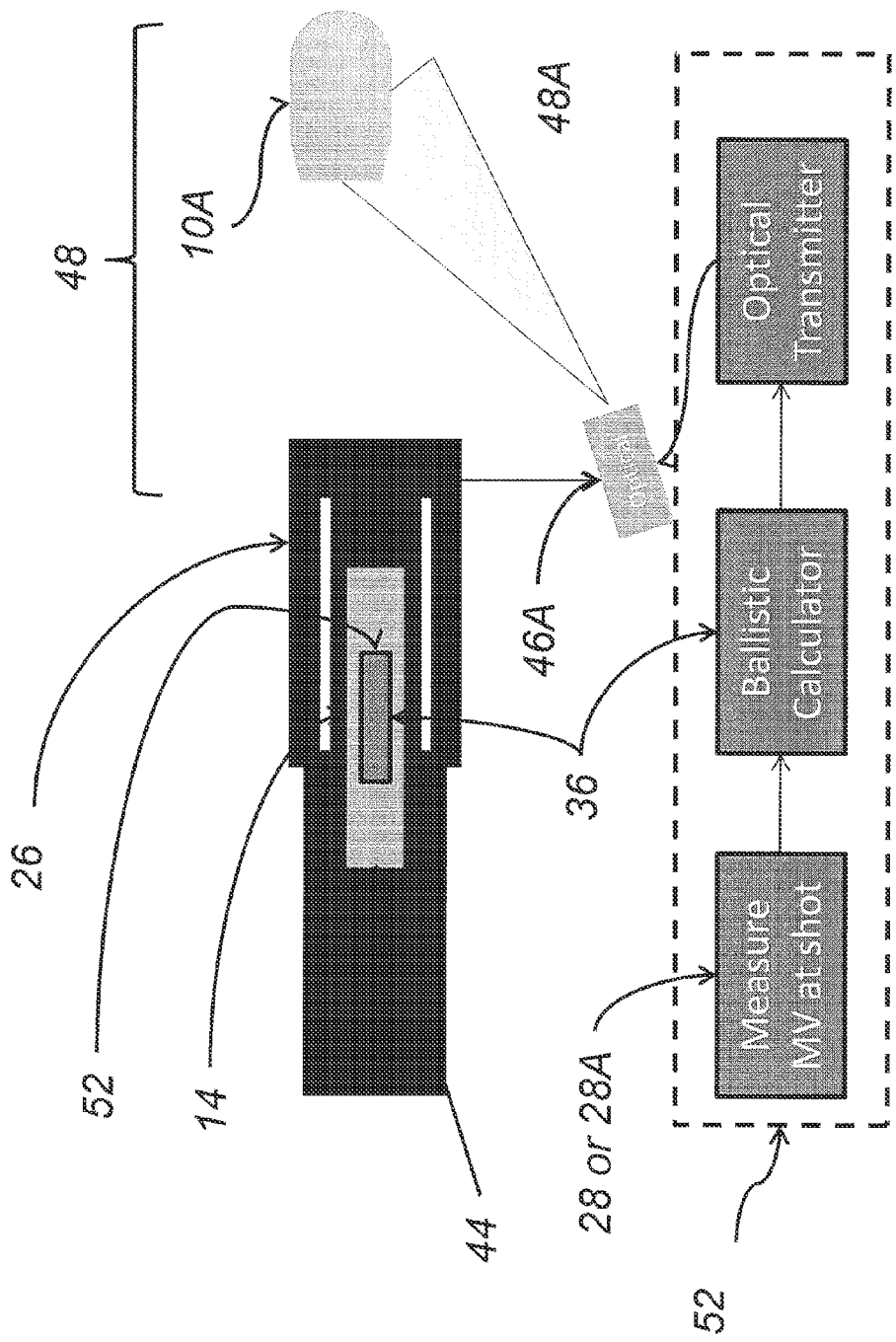
Figure 20 A – Kit Muzzle Velocity Measurement and Optical Programming
(and transmit an optical or RF signal to a post shot programmable projectile).

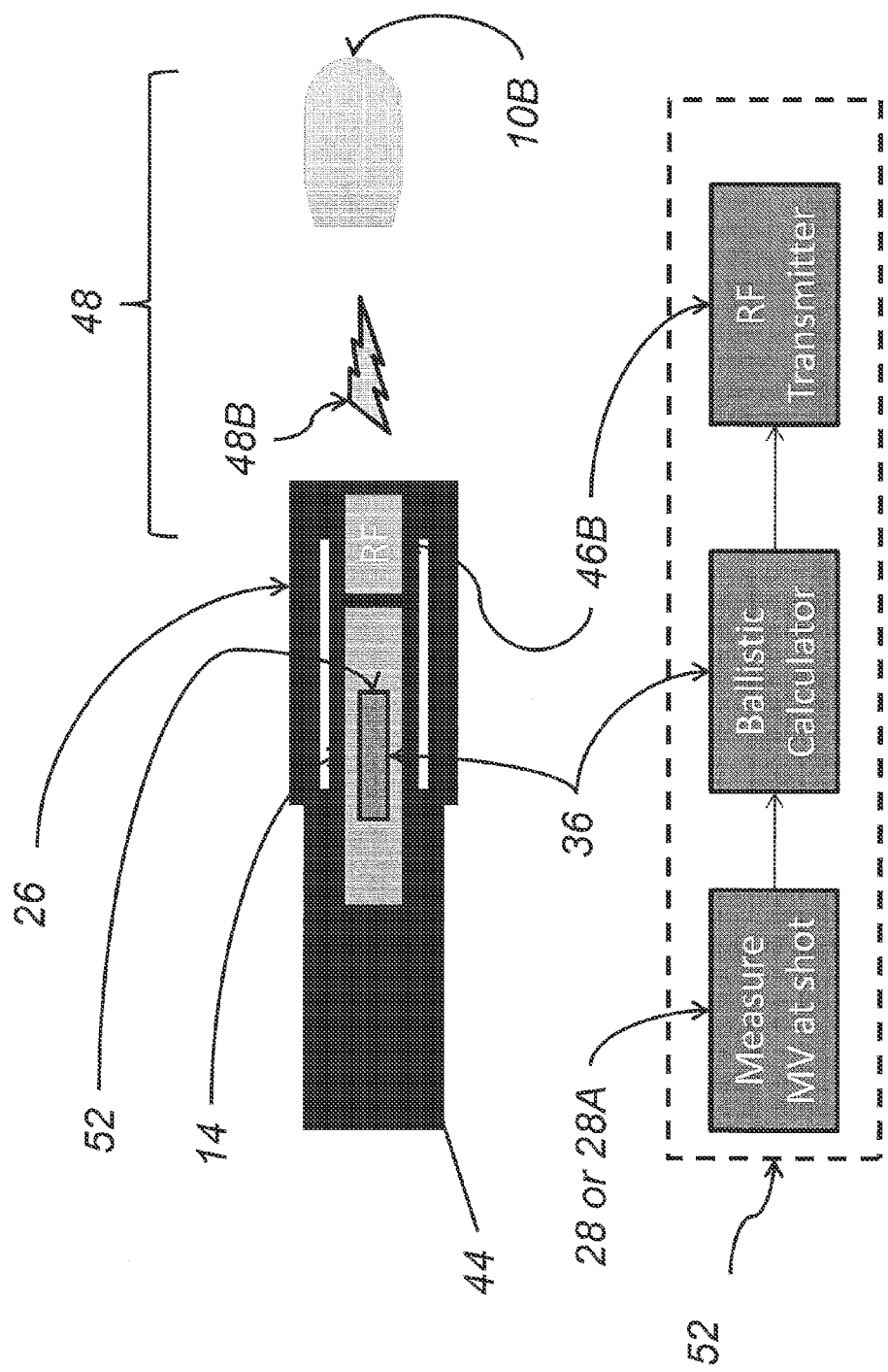
Figure 20 B – Kit Muzzle Velocity Measurement and RF Programming Kit (and transmit an RF signal to a post shot programmable projectile).

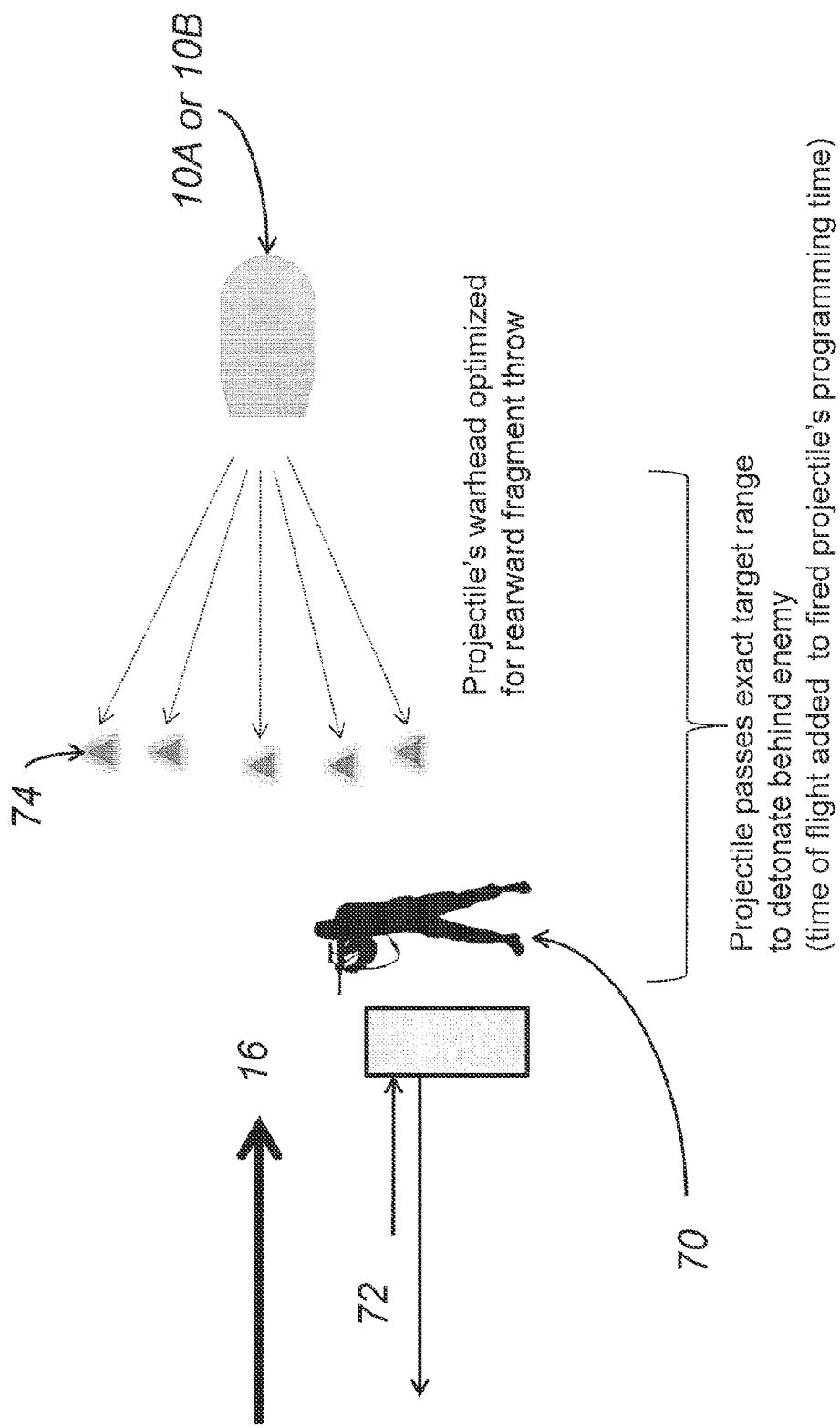
Figure 21A – Range finding and Detonation Position

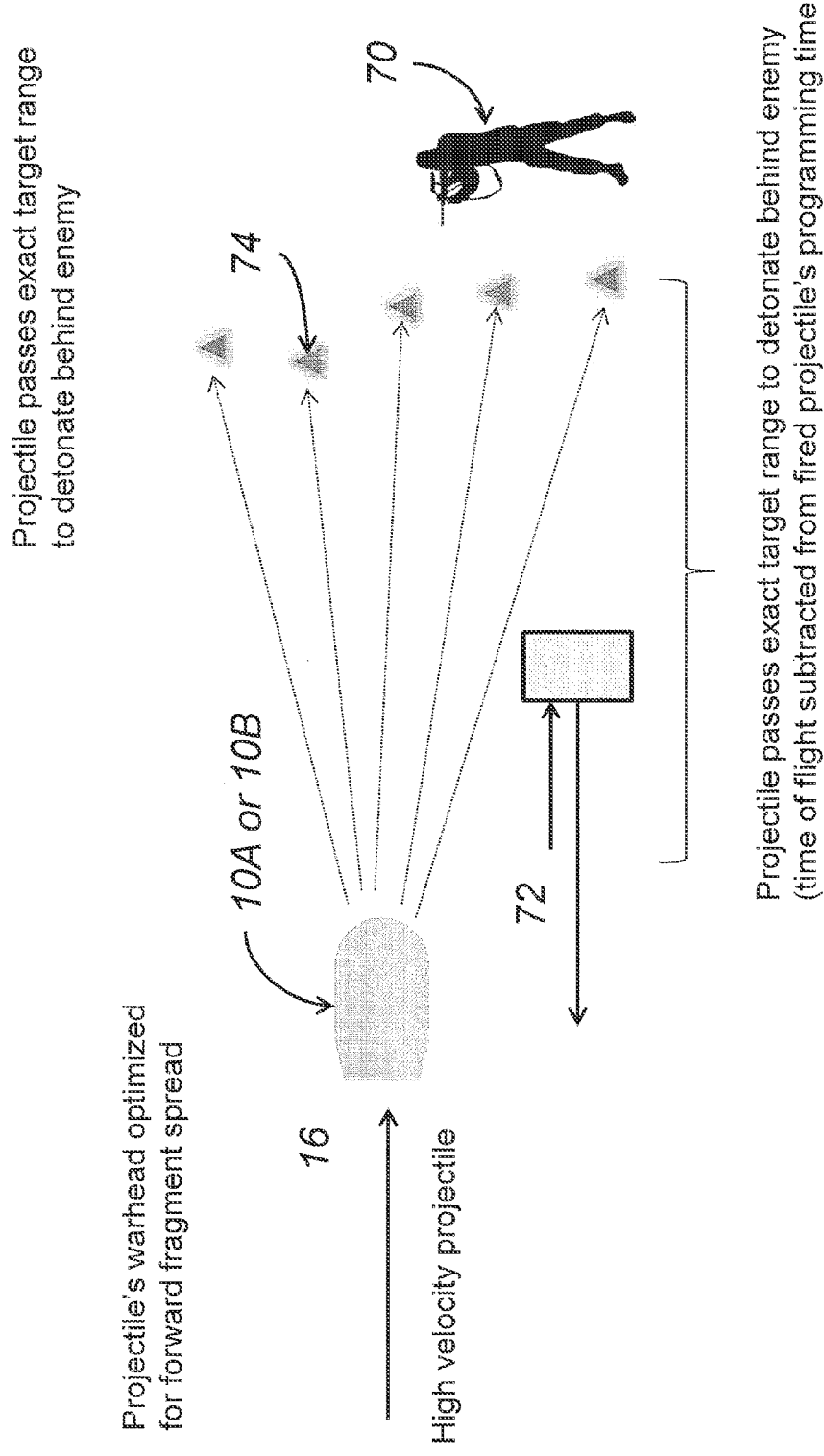
Figure 21 B – Range finding and Detonation Position

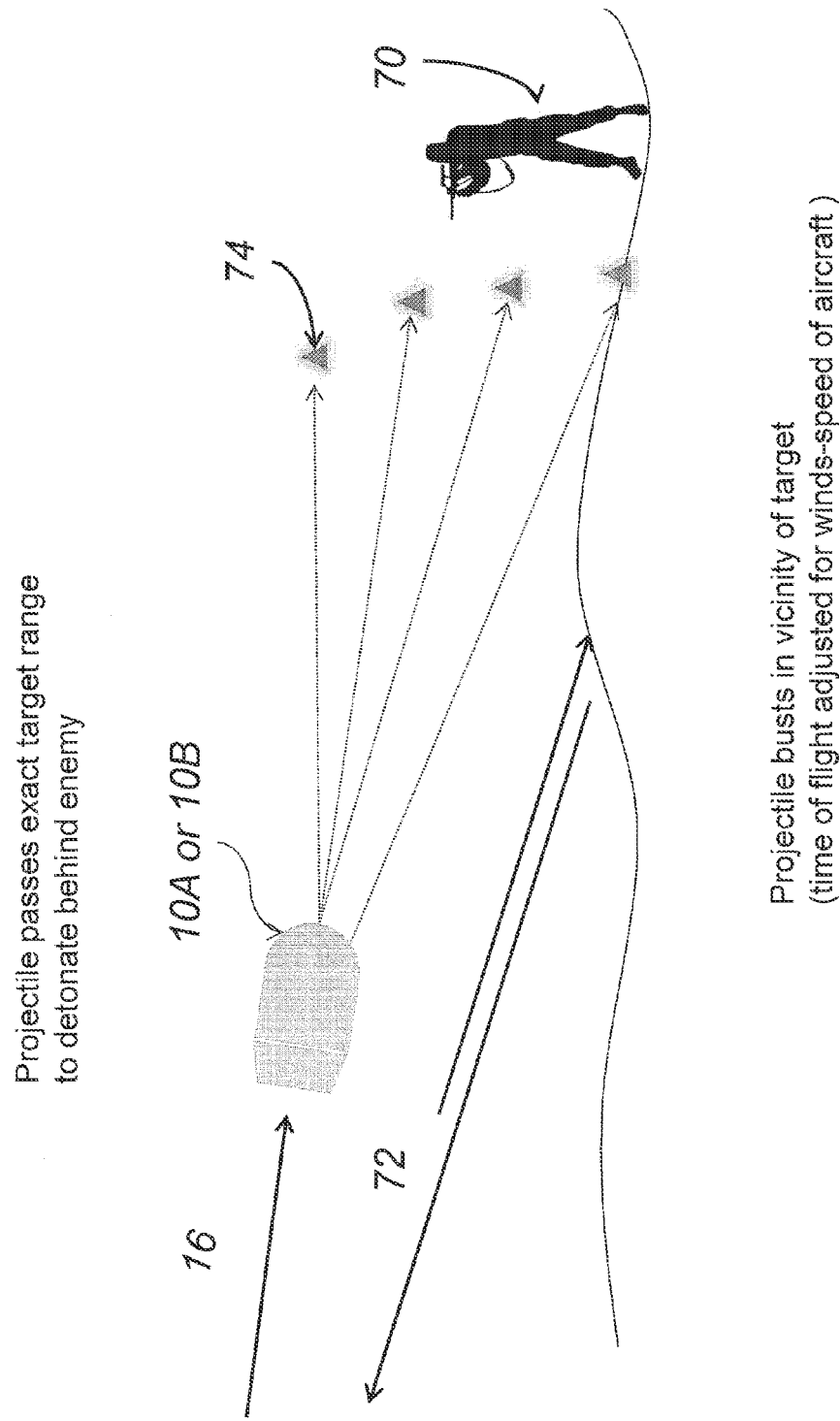
Figure 21 C – Range finding and Detonation Position Air to Ground

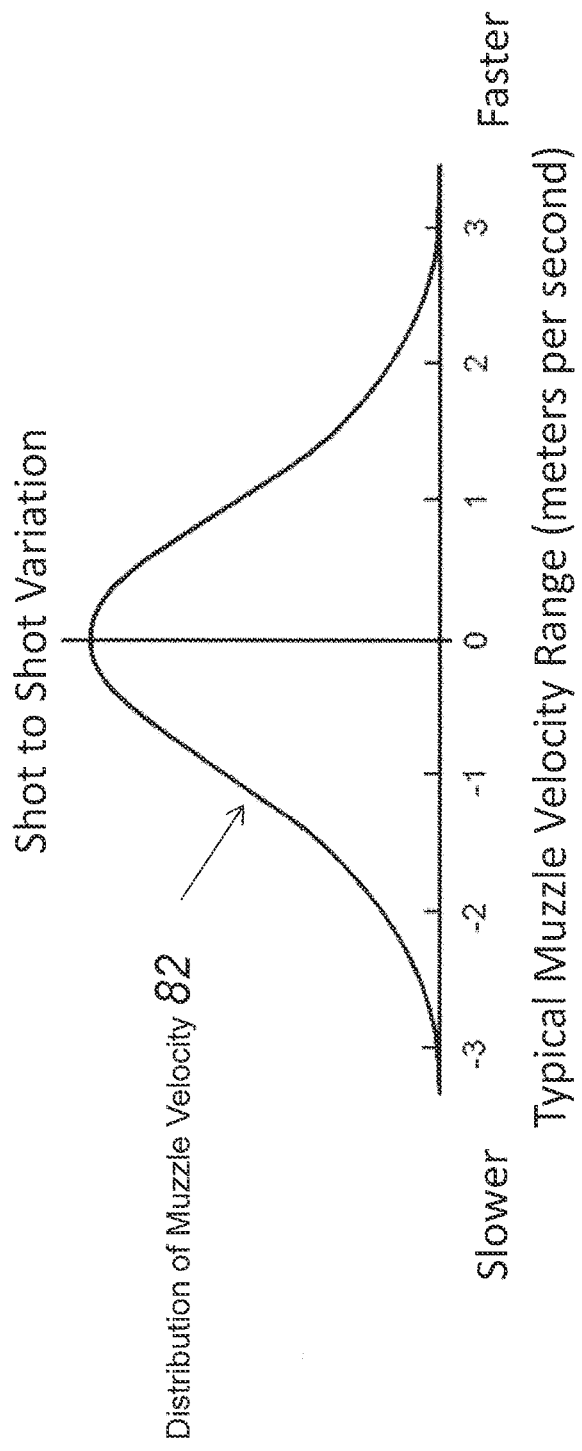
Figure 22 Natural Distribution of Muzzle Velocity in Fired Projectiles

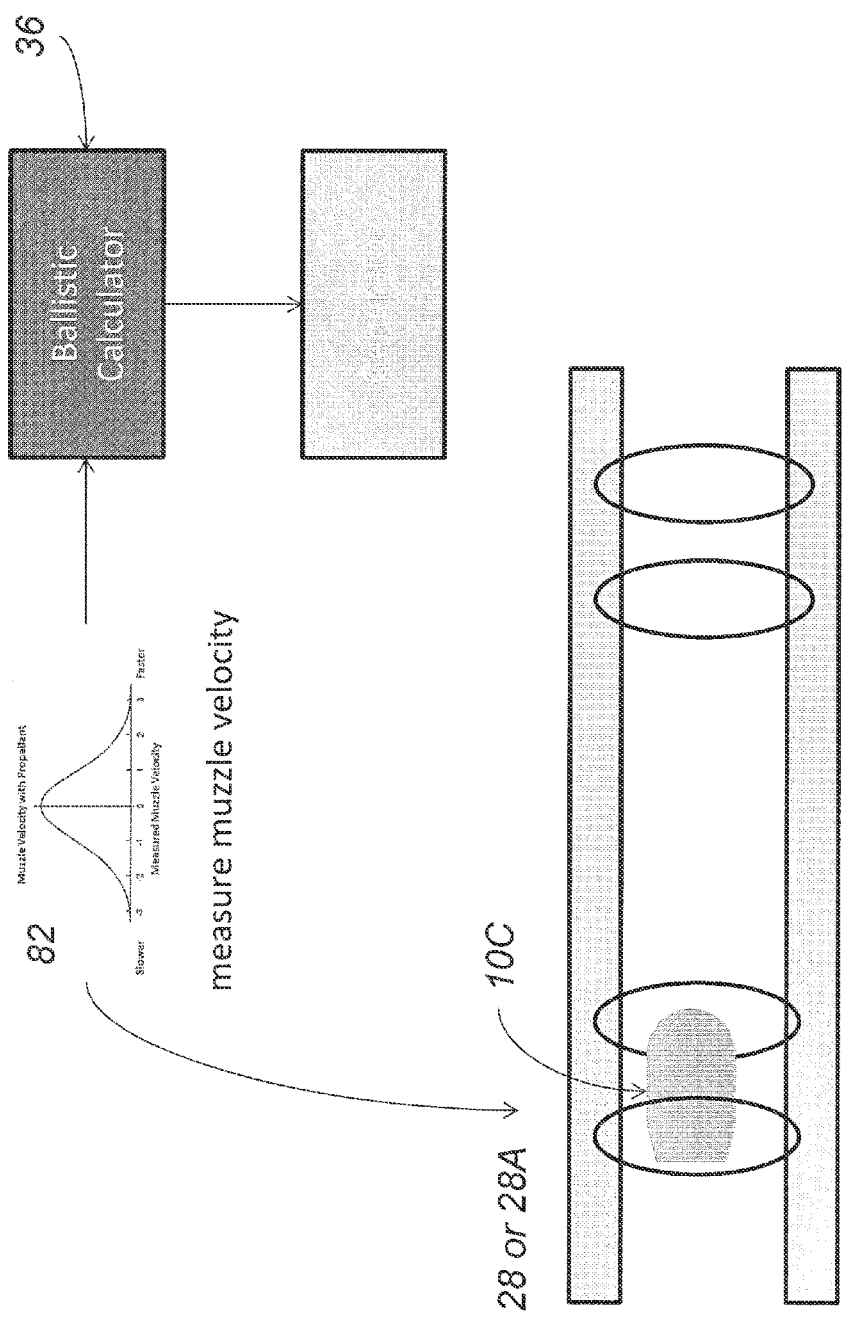
Figure 23 Methodology includes an Initial Measurement of Muzzle Velocity

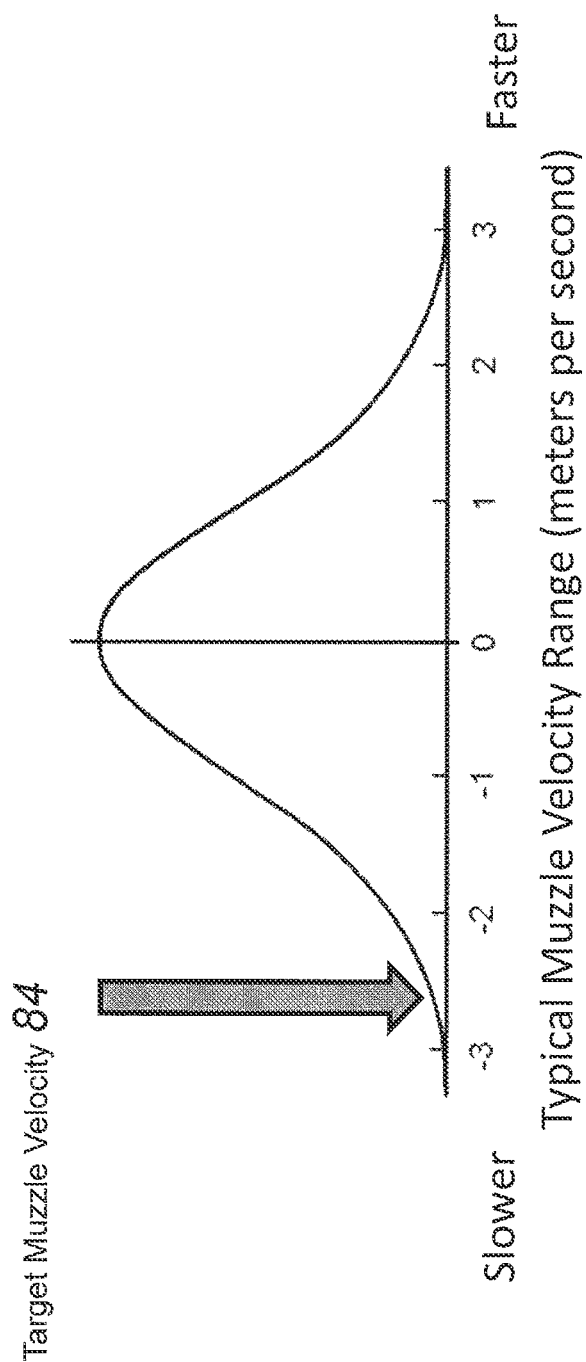
Figure 24 Target Muzzle Velocity

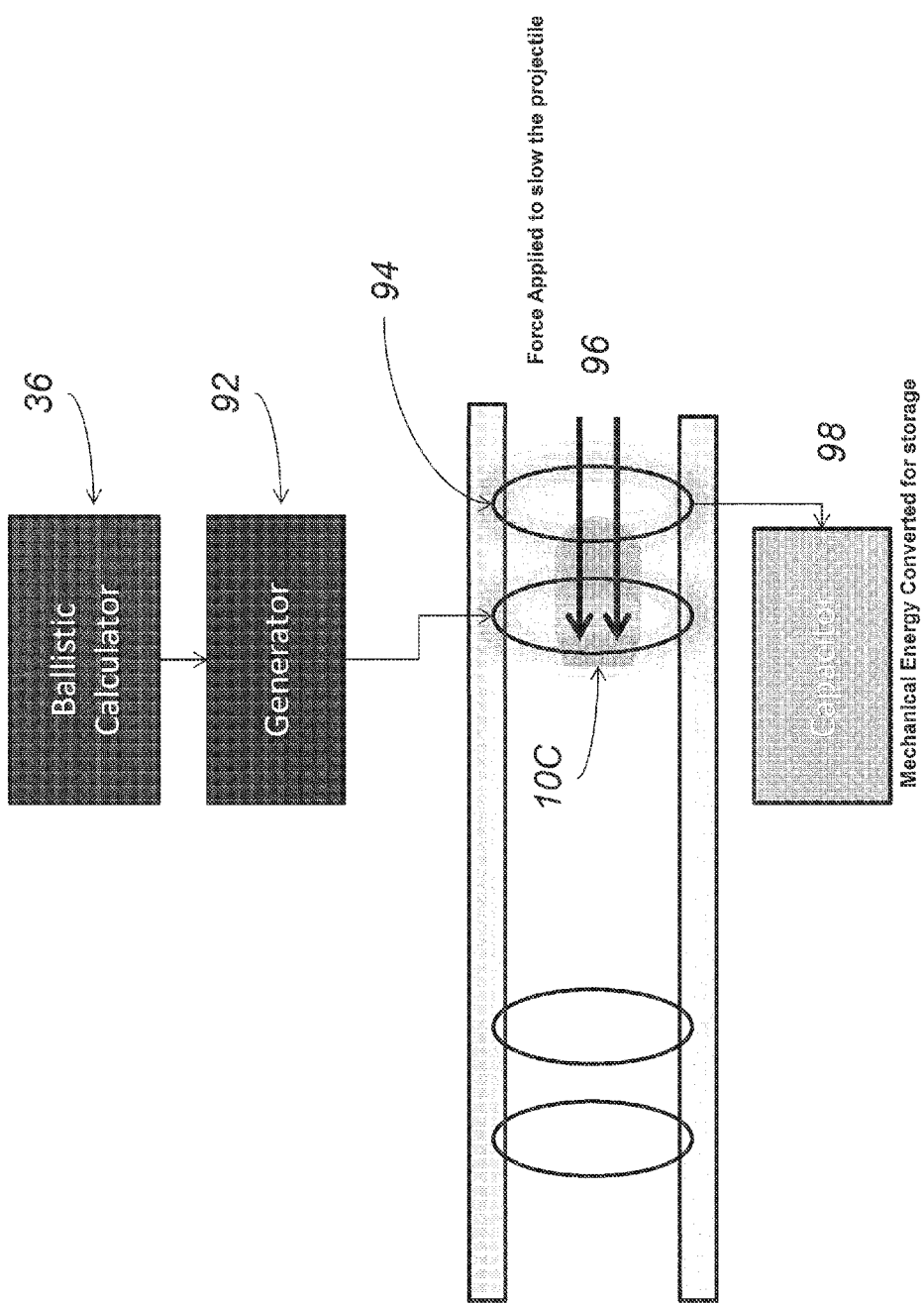
Figure 25 Methodology includes generation of a field force to slow projectile (to a target velocity)

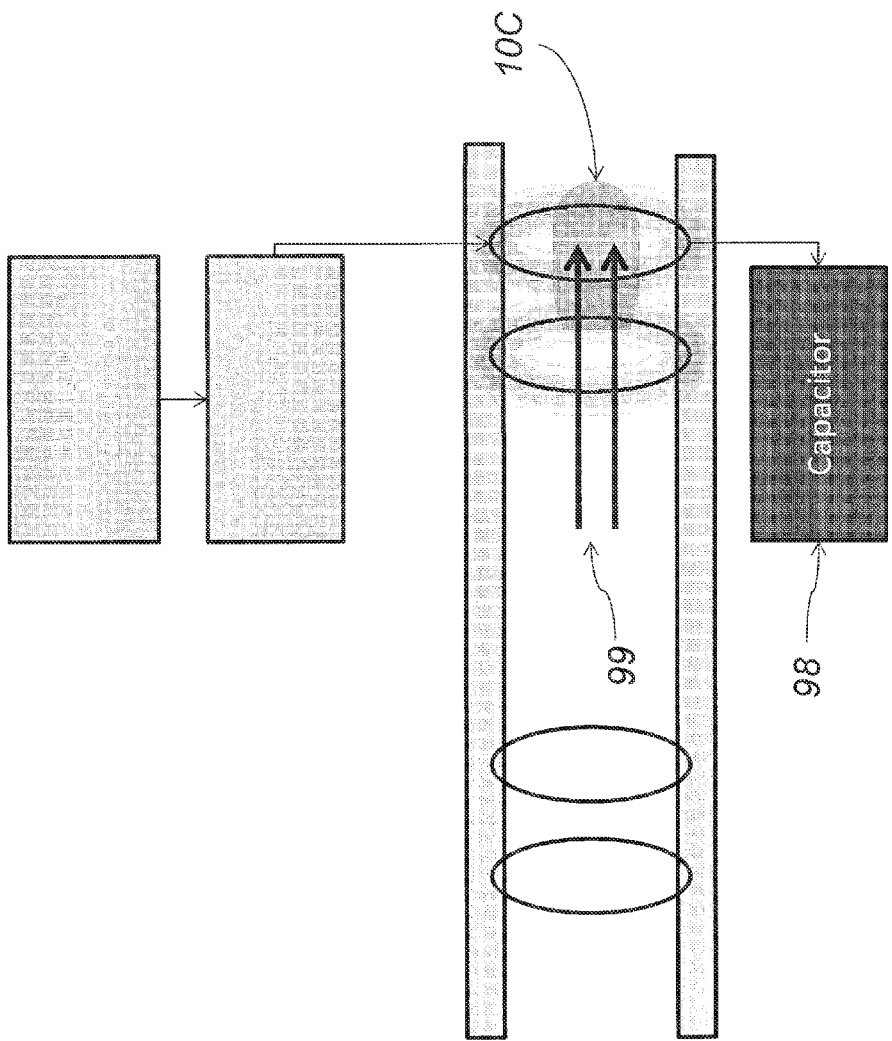
Figure 26 Methodology includes converting magnetic flux to a electrical charge
(and storing the charge to power electronics)

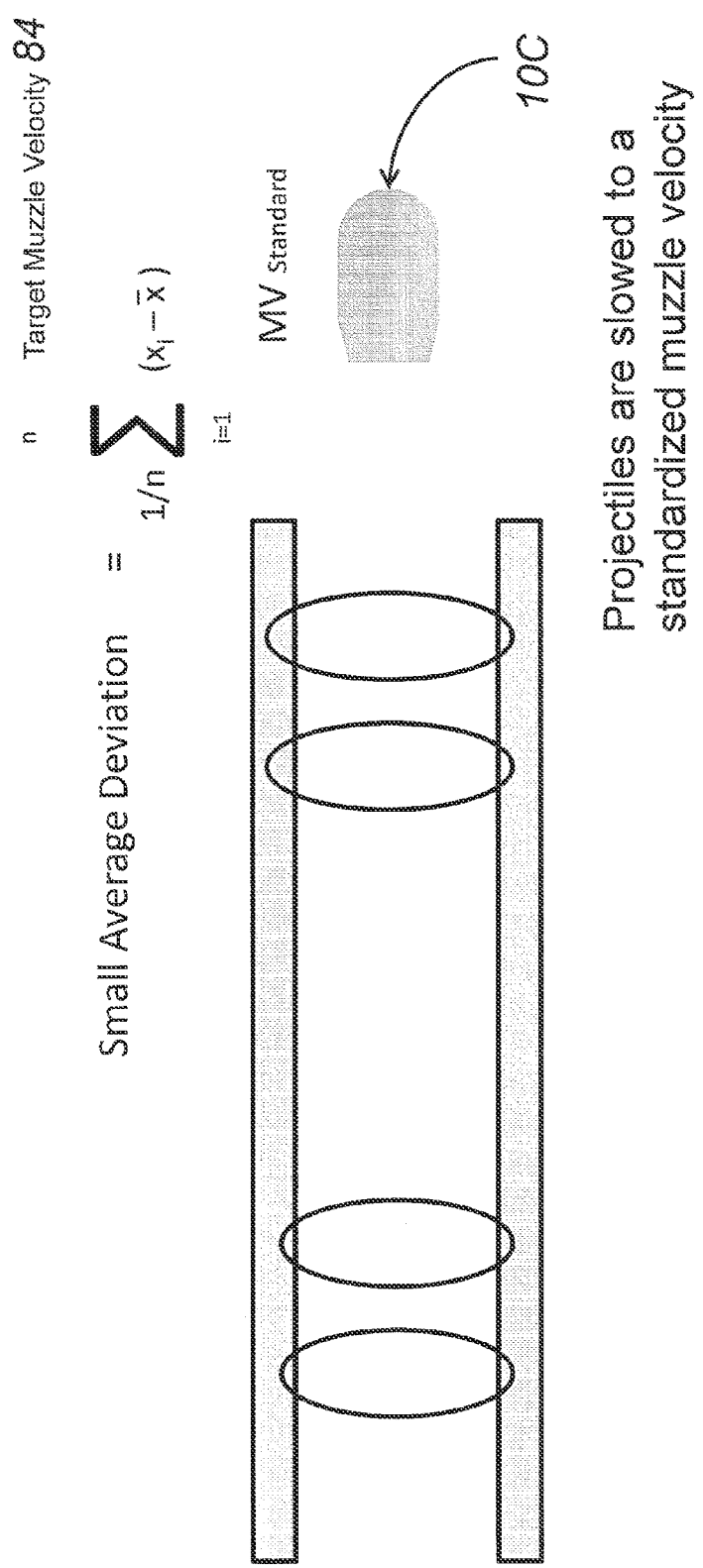
Figure 27 Methodology minimizes shot to shot variation and system accuracy

SYSTEMS TO MEASURE YAW, SPIN AND MUZZLE VELOCITY OF PROJECTILES, IMPROVE FIRE CONTROL FIDELITY, AND REDUCE SHOT-TO-SHOT DISPERSION IN BOTH CONVENTIONAL AND AIR-BURSTING PROGRAMMABLE PROJECTILES

CROSS-REFERENCE TO RELATED APPLICATIONS

This application is a continuation-in-part of U.S. patent application Ser. No. 14/227,054 filed Mar. 27, 2014. This claims priority from this parent application and from the U.S. Provisional Application No. 61/805,534 filed Mar. 27, 2013.

BACKGROUND OF THE INVENTION

While fire control systems have improved as sensor fidelity, electronic miniaturization and improvements in computational capabilities came of age, the inability to measure projectile yaw in operational weapons remains an unsolved problem that stands in the way of improvements in the precision aiming of firearms and weapons.

Specialized high-speed imaging and laboratory methodologies and equipment which are presently used to determine and measure yaw cannot be readily incorporated into firearms and weapons used in the field.

As a projectile exits a barrel it enters a "dirty" environment that obscures simple detection due to the wash of gases from the propellant (smoke, powder residue, un-burnt powder and bright illumination from the propellant burn). This situation adds to the difficulty of measuring projectile yaw and/or determining projectile motion parameters such as velocity and spin.

As a consequence, no practical or effective solution is presently available for firearms and weapons (hereinafter collectively referred to as "weapons") to measure initial flight parameters where projectiles are fired from weapons. The measurement of initial flight parameters allows fire control systems to record repeatable bias errors which include yaw and muzzle velocity. Ballistic algorithms can use recorded measurements in lot performance to improve predictive algorithms thus improving the precision of aim points and shooting.

Numerous methods of chronographic measurement of muzzle velocity are known in the art. The rate of change of velocity (acceleration/de-acceleration) is not normally measured, however, because it must be based upon multiple measurements of projectile velocity.

Variations in projectile spin create some variation in shot-to-shot precision but the magnitude of spin variation, as compared to the effect of yaw, does not significantly affect the flight ballistics in a way that can be translated into aiming improvements. Therefore, spin has also rarely been measured, even in the laboratory.

Beyond articulating new methodologies and measurement devices that can provide improved measurement fidelity, it is useful to incorporate muzzle velocity measurement subsystems into weapon kits to further optimize a weapon system's overall effectiveness. In this regard, it is instructive to first discuss some recent history regarding the use of muzzle velocity measurement and air-burst programming technology fitted to military platforms.

Measuring muzzle velocity: First, one should recognize that radar has been used to measure projectiles in flight since the Second World War. Today, the US Army has incorporated Doppler muzzle velocity radars as standard equipment fitted to the Army's new 155 mm US Army Paladin and 155 mm M777A1. The artillery fire control computers then use regressive algorithms in the ballistic computers to progressively adjust and refine the firing solutions. While radars and advanced fire control algorithms are "standard stuff" in modern artillery systems, the cost of Doppler radars and the threat posed by anti-radiation missiles precludes wider use of radar on smaller ground platforms. While radar costs may reach a cost point where the devices can be incorporated into smaller weaponry, it is possible to use alternative measurement methodologies and modify the time of burst or actual muzzle velocity for improved terminal effect.

Measuring muzzle velocity and programming ammunition: In the 1990s, Oerlikon invented the "AHEAD" technique of programming ammunition by measuring the velocity of an ammunition projectile passing through a muzzle break and then modulating an electro-magnetic signal to program ammunition passing through a muzzle break with a burst time optimized for the actual measured muzzle velocity for that projectile. This technique was disclosed in U.S. Pat. No. 5,814,756. The resulting product revolutionized gun based air-defense guns and is incorporated into the Rheinmetall Skyguard Air Defense system. There are two drawbacks of the AHEAD system: (1) the energy requirements (amperage) required to program a shot make it difficult to transition this technology to dismounted ground infantry systems and (2) the muzzle break is bulky with large conductive rings. The AHEAD technology has proven successful in the air defense system, however, and the technology has been successfully incorporated into the BAE Hagulunds CV 9035 system used by Denmark and the Netherlands.

Fire control, remote weapon stations and remote turrets: During the 1980s and 1990s armored vehicles and tanks acquired sophisticated fire control systems. Militaries worldwide have made increasing use of overhead weapon stations and remote turrets. In the United States, the initial fielding of the Kongsberg M151 Remote Weapon Stations took place on the US Striker vehicle program. Later, the same Remote Weapon System was adopted as the Common Remote Weapon Stations (CROWS) that was fielded throughout the US military inventory. The fire control systems, built and fielded in this period were designed to range targets, calculate vertical and horizontal aim adjustments based on firing tables and atmospheric sensors where the fire control solutions and algorithms were based on calculations that relied on the mean ammunition muzzle velocities of ammunition lots retained in a very large reserve ammunition stock. As stocks age, muzzle velocities change and eventually ammunition increasing muzzle velocity variations necessitates that the Army destroy stocks of ammunition.

In-bore ammunition programming: In the first decade of the $21^{st}$ century NAMMO's MK285 cartridge introduced the first airburst programmable 40 mm cartridge that was exclusively fired from the MK47 system, The MK47 was a package with an improved video based fire control and a weapon with a breach to accommodate "in bore" galvanic programming as taught in the Larson U.S. Pat. Nos. 6,138, 547 and 6,170,377. This system was acquired and fielded in SOCOM. During this period, other "in bore" techniques were also patented and developed by IMI, Rheinmetall and Picatinny Arsenal. The technical reasons that "in bore programming" techniques were initially favored was that the "in bore" approach provided bi-directional interfaces and certain electronic limitations in the 1990s influenced the system designers of that period to favor galvanic connections that accommodated (a) relatively high amperage levels, (b) capacitors with limited storage and (c) reserve batteries designs with slow power rise times. Yet, while there were benefits to "in bore programming" in the 1990s, one significant issue created a barrier to wide adoption of the technology: The cost associated with modifying firing platforms and fire controls proved to be significant and ultimately resulted in an insurmountable barrier to wide adoption of in-bore air-burst ammunition. During the recent war in Afghanistan, the USMC modified a limited number of their M1A1 tanks and fielded Rheinmetall's DM11 for restricted use in combat operations. The USMC's experience with the DM11 is instructive as the expense of modifying the USMC's M1A1 tank fleet to accommodate in-bore programming has stalled the project as the cost of upgrading all the USMC's M1A1 tank fleet proved unaffordable in a budget restricted environment.

Post-shot programming kit for programmable airburst ammunition: Again, one should recognize the AHEAD system was the first "post-shot programming" device fielded but, as noted previously, power demands and the cumbersome mass of the muzzle device precluded use of the system in dismounted weapons. As the defense industry entered a new millennium of the $21^{st}$ century, Moore's law continued to drive advancements and the electronic components advancements made "post-shot programmable ammunition" practical and affordable with the added benefit of being simpler to integrate into weapon platforms. In the second decade of the $21^{st}$ century, wireless RF and optical devices became ubiquitous in homes and businesses so the apprehension regarding wireless solutions faded. With wireless RF and optical solutions, system integration costs fell and the cost associated with upgrading systems to incorporate air-burst technology have fallen. Recognizing this, NAMMO and Singapore introduced "post-shot" RF programming and Rheinmetall introduced their DM131 which is an optical (IR) based programming as described in their U.S. Pat. No. 8,499,693.

Z-range velocity measurement and post-shot airburst programming kit: In configurations where programmable "airburst" ammunition is fired and where "post-shot programming" is used, the programming of a uniquely optimized time-of-flight for a fired projectile can provide military forces with distinct operational advantages. The introduction of "post-shot programming" kit that includes a muzzle velocity measurement device, ballistic calculator and programmer (or transmitter) affords military customers the ability to construct a system where the individual muzzle velocity of each shot is measured and a ballistic calculator computes an optimized flight time that is then transmitted to a projectile. By utilizing such a kit, military personnel can minimize the "range error" associated with muzzle velocity variation, improve precision, improve terminal effects and reduce ammunition expenditures in defeating targets. To illustrate the value of such a kit one can use a 40 mm×53 High velocity grenade as an example. Generally, a 40 m×53 grenade lot will exhibit 5-10 meter per second muzzle velocity variation within a sample. A 40 mm grenade fired at a range corresponding to 1500 meters would have 9.5 seconds of flight time. With a mean muzzle velocity variation of +/−5 meters per second multiplied by the grenade's 9.5 seconds of flight time, a volley of ammunition will generally fall at range distance 90 meters apart. At this range, the projectile is traveling at a velocity of 1 meter per millisecond and the electronic circuitry of the air-burst munitions' timing circuitry is within a few milliseconds of precision. In providing a device that (1) measures the actual muzzle velocity, (2) given a range, calculates "z" ballistic range error in a ballistic calculator and a corresponding optimized time-of-flight, and (3) programs the ammunition "post-shot" to detonate a prescribed flight duration in a weapon kit, allows the military to upgrade weapons so that weaponry will accurately air-burst at a programmed range.

Z-range muzzle velocity measurement and regulation kit: Current propellant and mechanical technology limits the repeatability of ammunition muzzle velocity which varies in both lot-to-lot and shot-to-shot conditions. Environmental parameters further complicate the repeatability of muzzle velocity as it is well known that the temperature of ammunition propellant influences a projectile's muzzle velocity. At distance, projectiles with a higher muzzle velocity travel farther and hit vertical targets at a higher elevation when compared to slower traveling projectiles. Muzzle velocity effects both the range "z" error and the vertical target impact "y" error. Like range "z" error programming, it is possible to use a projectile's actual measured muzzle velocity and, with a kit, consistently reduce or increase the muzzle velocity of projectiles to a standardized slower velocity and improve the shot-to-shot performance of a weapon system. In significantly reducing or increasing the variation in muzzle velocity to a target velocity, a weapon system's precision can be increased. Some ammunition families use projectiles that are metallic and are subject to the influence of magnetic forces. Solenoids are well known to create mechanical force actuators whereby electric current applied to a coil creates a magnetic force which, in turn, creates a mechanical force. A kit composed of a device that (1) measures the actual muzzle velocity in the barrel or in a flash suppressor, (2) given a known magnetic characteristic of a bullet design or model, calculates a unique force to apply to each specific projectile transiting from a muzzle into a flash suppressor or muzzle break and (3), where the force applied after measurement, reduces the velocity to a standardized and repeatable velocity for a given type of ammunition. A kit adapted or incorporated into a weapon, configured accordingly, could deliver ammunition traveling at a highly repeatable muzzle velocities and reduce shot-to-shot dispersion thus improving the precision of the entire weapon system.

New kits measuring muzzle velocity, precisely programming unique air-burst duration or kits adjusting muzzle velocity to a reputable target velocity are relevant as currently available fire control platforms are only optimized for x and y (lateral and vertical) error correction and are not configured to correct muzzle velocity and program z (range) error. As discussed herein the modification of existing fire-control sub-systems with new algorithms, new electronics and sensors can prove to be complex and costly. Accordingly, kits that modify existing fire controls should be considered.

In many projectiles, the variation in muzzle velocity is a significant factor contributing to dispersion of impact points and overall system error. Accordingly, a system that measures muzzle velocity coupled with a system that adjust air-burst programming of air airburst ammunition will improve the terminal effects of air burst ammunition. Moreover, a device that measures muzzle velocity coupled with a system that influences the muzzle city of an exiting projectiles can reduce the dispersion of impacting projectiles.

SUMMARY OF THE INVENTION

A principal objective of the present invention, therefore, is to provide a flight parameter measurement system, for use in the field with an operational weapon, that can determine projectile muzzle velocity, spin and yaw at a plurality of points during projectile's initial flight after barrel exit through a measurement device housed in a flash suppressor or muzzle break.

It is a further objective of the present invention to provide a flight parameter measurement system for use with an operational weapon that can determine the rate of change of muzzle velocity, spin and yaw.

It is a still further objective of the invention to provide methodologies and kits that militaries can incorporate into weapons systems to reduce shot to shot dispersion. By measuring muzzle velocity using either prior art techniques or new techniques taught herein, and by incorporating the measurement systems into a kit, militaries can improve the terminal effect and precision of weapon systems. Where air-burst programmable ammunition is used, a device can program ammunition "post-shot" after muzzle exit with updated optimized time-of-flight programming data. Alternatively, where standard projectiles contain ferrous materials, a device can measure muzzle velocity and subsequently slow or increase the velocity of projectiles to eliminate the projectile's muzzle velocity variation, thus improving the impact precision and associated overall terminal effect of fired munitions.

These objects, as well as still further objects which will become apparent from the discussion that follows, are achieved, in accordance with one aspect of the present invention, by providing an otherwise conventional ammunition projectile with a plurality of marks arranged in at least one circular row around the projectile body, with the row of marks extending perpendicular to the longitudinal axis of the projectile and being of such character as to be seen by an optical detector while exiting the barrel.

Method and apparatus for 6DOF measurement at barrel exit: Preferably at least some of the marks have distinctive patterns such that the optical detector can discriminate between marks with different patterns.

Alternatively or in addition, at least some of the marks have distinctive colors such that the optical detector can discriminate between marks with different colors.

Alternatively or in addition, at least some of the marks are luminescent.

All of the marks may have the same shape, or some of the marks may have a different shape than others. For example, at least some of the marks may be in the shape of a cross.

Based on the use of such an ammunition projectile, the present invention provides a projectile flight parameter measurement system which is usable with a weapon to accomplish the objectives described above. This system preferably includes the following components:

(a) a tubular housing which is configured to be attached to the weapon with its longitudinal axis aligned with the central longitudinal axis of the gun barrel, so as to receive launched projectiles as they leave the muzzle end of the barrel;

(b) at least one light beam emitter arranged in the housing for illuminating the projectiles as they pass through the housing;

(c) at least one electronic imager arranged in the housing for viewing the projectile markings that are illuminated by the emitter, and for producing electronic signals representing digital images of the projectiles; and (d) an electronic computational logic device, coupled to the electronic imager(s), for processing the electronic signals to determine one or more initial flight parameters of a projectile that has passed through the housing. According to the invention, these projectile flight parameters comprise one or more of the following:

(1) projectile muzzle velocity;
(2) projectile spin;
(3) projectile yaw;
(4) projectile rate of change of muzzle velocity;
(5) projectile rate of change of spin; and
(6) projectile rate of change of yaw.

The present invention makes it possible to measure the asymmetrical gas expansion forces on the base of a projectile that is exiting a barrel. When utilizing induced fluorescence, laser or LED light can be used to detect the relative movement and position of the projectile with respect to the centerline of the barrel so as to measure the asymmetric expansion (leakage) of gases as it exits the barrel.

The beam emitter provides strobe illumination and the electronic imager captures images of the projectiles as they are illuminated by the emitter. In particular, the emitter strobes the illumination and the imager captures stop-action images at the instants of illumination.

Preferably, imagers capture two or more successive views of the projectiles as they pass through the housing. For example, the imager may capture views at different angles around a circumference of the projectiles as they pass through the housing or they may capture images at the same angle at successive points along the flight path.

According to a preferred embodiment of the invention, the system emits a radiation beam. The radiation beam may be in one of the UV, visual and/or IR spectral bands, for example.

According to another preferred embodiment of the invention, the weapon includes an aiming device for the gun barrel, and the logic device is coupled with the aiming device for adjusting the aim of the barrel in dependence upon the flight parameters.

The apparatus according to the invention thus utilizes short-duration strobe illumination of a projectile that has special marks on its surface. As the strobe illuminates the projectile, the relative position and attitude of the projectile is observed.

Advantageously, the projectile markings are imprinted with specialized dyes that are visible when exposed to illumination (strobes) at certain wavelengths. This facilitates optical tracking of the index marks on the projectiles exiting the barrel and traveling through a flash suppressor or muzzle break.

It is desirable to use laser or LED light and "induced fluorescence" obtained from different colored fluorescent dyes used for the markings imprinted on the projectile, denoting the indexed rotation position of the projectile, to increase the visibility of the markings. This technique provides for a high signal-to-noise ratio which is very useful when using electronic and signal processing equipment to detect movements of the projectile in a "dirty" environment. As previously noted, the environment for observation is "washed" with smoke, un-burnt powder residue, burnt powder residue and burning propellant so that it is difficult, if not impossible, to determine the position and attitude of the projectile by viewing only its outline.

When utilizing induced fluorescence, laser or LED light can be used to detect the relative movement and position of the projectile with respect to the centerline of the barrel so as to measure the asymmetric expansion (leakage) of gases when a projectile exits a barrel.

Generally speaking, projectiles do not undergo a complete rotation in a distance less than 250-300 millimeters. If a yaw and muzzle velocity device was devised to observe a complete rotation, it would probably become too long and bulky for rifleman. Accordingly, multiple viewing points and differentiated indexing points on a projectile allow for a precise measurement of yaw and muzzle velocity over a short distance, allowing the device to have an optimum compact nature.

The following Table illustrates the relationship of the muzzle velocity and spin to measurement distance for three different weapon systems.

TABLE 1

.338 Data (Rifle System)

| 2890 | rotation/second | 3.66 | rotations/meter | |
|------|-----------------|------|-----------------|--|
| 790  | meters/second   | 273 mm | 1 rotation | 360° degrees |
|      | Measurement Length | 91 mm | 1/3 rotation | 120° degrees |

.50 Cal Data (12.7 mm) (Machine Gun)

| 2707 | rotation/second | 3.18 | rotations/meter | |
|------|-----------------|------|-----------------|--|
| 850  | meters/second   | 314 mm | 1 rotation | 360° degrees |
|      | Measurement Length | 105 mm | 1/3 rotation | 120° degrees |

40 mm × 53 Data (HV) (Automatic Grenade Launcher)

| 200 | rotations/second | 0.83 | rotations/meter | |
|-----|------------------|------|-----------------|--|
| 240 | meters/second    | 1200 mm | 1 rotation | 360° degrees |
|     | Measurement Length | 200 mm | 1/6 rotation | 60° degrees |

To measure the motion parameters (muzzle velocity, spin and axis rotation (yaw) as well as acceleration/de-acceleration of the projectile, the projectile is illuminated two or more times as it exits the barrel thru the muzzle of the weapon. After each illumination and image capture, the positions of the projectile's indexing marks are determined and stored. The illumination sequence is repeated at known elapsed times following barrel exit. As a result, this process allows for accurate determination of the yaw, spin and muzzle velocity, as well as any acceleration/de-acceleration of the projectile in a compact device.

Recorded projectile measurements are then transmitted to a fire control system (internal or external to the flash suppressor or muzzle break). This allows the fire control computer to classify the projectile's performance in the particular individual weapon system. This can be done as part of a registration methodology or for improved prediction of aiming points. Since ammunition muzzle velocity, spin and yaw vary from ammunition lot-to-lot and from gun-to-gun, the detection of changes in rotational axis, yaw and muzzle velocity for each individual weapon provided with the system of the present invention result in continuous improvements in aiming precision in azimuth (x) and elevation (y).

The forgoing measurement system makes it possible to measure the precise muzzle exit velocity, spin and yaw of the projectile while at two or more positions while still transiting a flash suppressor or muzzle break. The system can also provide the individual weapon with a sensor input leading to better precision and ballistic prediction and aiming precision when the measurements are incorporated into fire control computations.

Method and apparatus for post-shot programming of airburst ammunition utilizing actual muzzle velocity measurements: Where programmable ammunition has a "post-shot programming" capability a device (1) measures the actual muzzle velocity, (2) given a external range signal, calculates "z" ballistic range error in a ballistic calculator and a corresponding optimized time-of-flight and (3) programs ammunition that has exited the muzzle to detonate a prescribed flight duration. The device will use a methodology to (a) measure projectiles, (b) calculate an optimum program time for a measured velocity and (c) when a projectile reaches a programming station (d) a transmission with an optimum time of flight is sent to a projectile. An optimum target range is acquired from a external range finder, fire control or dial a range input device. The measurement device and calculator is in an optimum configuration incorporated into a muzzle break, flash hider or flash suppressor. The ballistic calculator is either in an external fire control or incorporated into the device attached, affixed or otherwise incorporated into a flash suppressor. The ammunition in this configuration is a programmable airburst projectile. Accordingly, a weapon with such a kit will fire programmable ammunition with the projectile repeatedly detonating at a precise range.

Method and apparatus for regulating the muzzle velocity of fired projectiles: Where (1) ammunition incorporates a projectile of specific magnetic characteristics and (2) when the projectile transits the weapons a barrel and muzzle break and (3) a device (a) surrounding the barrel and muzzle break and (b) generates a magnetic force that acts on a projectile to reduce the velocity. A device of this type will employ a functional methodology that (1) measures the actual muzzle velocity in the barrel or in a flash suppressor, (2) given a known magnetic characteristic of a bullet, calculates a unique force to apply to each specific projectile transiting from a muzzle into a flash suppressor or muzzle break, (3) where the force applied after measurement reduces the velocity to a slower "regulated" velocity. The measurement device and calculator is in an optimum configuration incorporated into a muzzle break, flash hider or flash suppressor. The ammunition has ferrous metal properties that allow magnetic forces to act on the projectile at barrel exit. Accordingly, a weapon with such a kit will fire ammunition with a highly repeatable muzzle velocity reducing the "y" dispersion observed in ammunition at extended ranges.

Kits formed using specific projectile characteristics, muzzle exit measurements, ballistic calculators and weapon system effects: The three sub-systems disclosed in this patent can be used in numerous configurations to upgrade or improve the performance of weapons firing ammunition with specialized characteristics. All kits include a ballistic calculator using acquired muzzle exit information. This application discloses a $1^{st}$ sub-system provides a methodology where uniquely marked ammunition and optical sensors measure 6DOF data at muzzle exit. A $2^{nd}$ sub-system, to then program a air-burst programmable ammunition, uses muzzle velocity measurements to calculate a precise flight time and then transmits that precise unique flight time to a projectile at a programming station external to the muzzle break. A $3^{rd}$ sub-system, after measuring muzzle velocity then acts on any ferrous projectile, to slow or accelerate the projectile to a constant target velocity.

The following table illustrates the relationship of sub-systems whereby a sub-system initially measures a projectile's unique exit conditions (that as a minimum includes muzzle velocity at exit). A unique 6DOF measurement sub-system is disclosed. The $2^{nd}$ and $3^{rd}$ sub-systems can use the disclosed 6DOF sub-system or a sub-system using prior art to either program or regulate ammunition:

To program air-bursting projectiles a sub-systems and method uniquely programs air-burst munitions with a flight time (duration) using measured muzzle velocity post muzzle exit.

To regulate ammunition fired from a weapon the a sub-system adjusts the muzzle velocity of ammunition exiting a barrel by inducing acceleration or deceleration on a ferrous projectile prior to muzzle exit.

The sub-systems all require (a) ammunition with a unique nature, (b) all sub-systems acquire muzzle exit information to include muzzle velocity and (c) all sub-systems include a ballistic calculator to utilize muzzle exit data to varying purpose. The new, unique measurement of 6DOF information is used with ballistic calculator in a fire-control to improve the placement and aiming for horizontal and vertical targets. The new, unique sub-system to program ammunition with updated time to detonate instructions where programmable ammunition is used forms a $2^{nd}$ kit. A $3^{rd}$ sub-system consists of a method to regulate the exit velocity of ammunition. Certain parameters and techniques are used and two system effects reduce shot to shot dispersion by different means. Each sub-system uses unique methodology and the sub-systems allow for production of kits that will improve the performance of weapon systems.

FIGS. 5 and 6 are front and side views of a flash suppressor for RWS and 40 mm AGLs incorporating an emitter (FIG. 5) and an optical detector (FIG. 6) according to the invention.

FIG. 7 is a block diagram of the system according to the invention incorporated into a flash suppressor for a 40 mm AGL.

FIG. 8 is a schematic view of a flash suppresser showing gas wash, powder burn and debris that obscures observation of the fired projectile.

FIG. 9 is a schematic view of a flash suppresser showing the flash illumination of a projectile in first position.

FIG. 10 is a schematic view of the flash suppresser of FIG. 11 showing the image capture of markings on the projectile in the first position.

FIG. 11 is a schematic view of a flash suppresser showing the flash illumination of a projectile in a second position.

TABLE 2

Table 2: Measurement - Projectile - Parameter - Technique and System Effect

| Measurement Approach | Ammunition Projectile | Sub-system Parameter and Technique | System Effect |
| --- | --- | --- | --- |
| (New) Optical High Speed Processed Image | Coordinate Marking | Measure 3 Initial Flight Parameters | Post-Shot Ballistic Aim Improvement (Horizontal x and Vertical y) |
| Measurement or Prior Art Muzzle Velocity | Air-Burst RF or Optical "Post-Shot Programmable" | Using muzzle velocity measurements, a ballistic calculator computes a corrected time of flight (time to detonate) using RF or optical programming a projectile's time of flight is programmed "post-shot" | Post-Shot programming transmits and exact flight time for a exiting projectile (Range Error) with an effect that reduces Shot-to-shot Range Error "z" range dispersion. |
| | Conventional Ferrous | Using muzzle velocity measurements, a computer calculates a force to be imparted on a projectile that reduces (Regulates) Shot Dispersion by inducing a magnetic field to slow or accelerate ammunition to a target velocity. | Regulate Muzzle Velocity of exiting projectiles (Range Error) with an effect that reduces Shot-to-shot Range Error "z" range dispersion. |

New kits measuring muzzle velocity and programming air-burst duration or kits adjusting muzzle velocity are relevant as currently available fire control platforms are only optimized for x and y (lateral and vertical errors) correction and are not configured to correct muzzle velocity and program z (range error). As discussed herein the modification of existing fire-control sub-systems with new algorithms, new electronics and sensors can prove to be complex and costly. Accordingly, kits that modify existing fire controls should be considered.

For a full understanding of the present invention, reference should now be made to the following detailed description of the preferred embodiments of the invention as illustrated in the accompanying drawings.

BRIEF DESCRIPTION OF THE DRAWINGS

FIGS. 18A and 18B are detailed diagrams of the weapon system of FIG. 17 showing optical and RF transmission, respectively, to the projectile during flight.

FIG. 18C illustrates the use of the system of FIG. 17 by a gunnery crew.

FIGS. 19A, 19B and 19C are block diagrams illustrating three steps of the methodology used in the system of FIG. 17.

FIGS. 20A and 20B depict a "kit" for implementing the system of FIG. 17 using optical and RF signals, respectively, to transmit programming to the projectile.

FIGS. 21A, 21B and 21C are representational diagrams showing the detonation of an airburst projectile behind the enemy.

FIG. 22 is a graph showing a typical distribution of muzzle velocities for projectiles fired from a weapon.

FIG. 23 is a representational diagram showing measurement of muzzle velocity using magnetic coils.

FIG. 24 is a graph showing a typical distribution of muzzle velocities for projectiles upon reaching a target.

FIG. 25 is a representational diagram showing the use of magnetic coils to retard the speed of a projectile.

FIG. 26 is a representational diagram showing the use of magnetic coils to convert mechanical energy from a speeding projectile into electrical energy for capacitive storage.

FIG. 27 is a representational diagram showing the use of magnetic coils to minimize the shot-to-shot variation of muzzle velocity.

DESCRIPTION OF THE PREFERRED EMBODIMENTS

Figure 1:
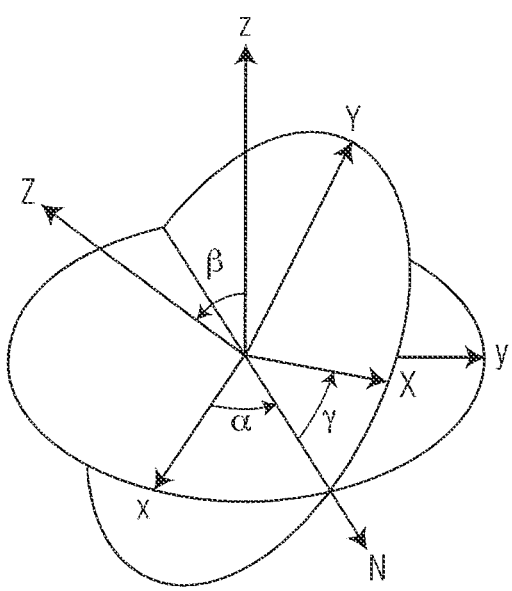
FIG. 1 is a Cartesian coordinate diagram showing various angles of yaw.

The preferred embodiments of the invention will now be described with reference to FIGS. 1-30 of the drawings. Identical elements in the various figures have been designated with the same reference numerals.

The system according to the invention utilizes the following components:

Projectiles provided with high contrast markings (e.g. color dyed) which may include luminescent characteristics.

Strobe illumination of the projectiles as they exit the barrel of a gun and pass through a flash suppressor or muzzle break.

Imagers that capture positions of the projectile markings. Three measurement points are desired so that the rates of change of the parameters can be measured.

Optical measurements are captured and recorded, preferably from multiple angles to confirm the rotation axis.

A computer with a signal processor, coupled to the imagers, determines the locations of the projectile markings at successive instants of time and computes and records the yaw, spin and muzzle velocity and the rates of change in these parameters.

Generally, for integration into a weapon system it is advantageous to incorporate the illumination and image detection into flash suppressor or muzzle break. By incorporation of these elements into a robust housing, additional spill-light is not transmitted. The illumination of the projectile coincides with the light resulting from propellant burn, commonly known as "muzzle flash". By incorporating the illuminators and electronic imagers into a common robust housing it is possible to utilize the flow of un-burnt powder in a manner that optimizes recording of the projectile yaw, spin and muzzle velocity. Integration of the system into a flash suppressor or muzzle break provides for simple upgrading or retrofitting of operational weapons.

FIG. 1 shows two Cartesian coordinate systems, x,y,z and X,Y,Z, arranged along the barrel axis N of a weapon. The two systems have are angularly displaced with respect to each other by angles α, β and γ. The figure demonstrates the many degrees of freedom of a projectile in space which result in variations in ballistic flight.

Figure 2:
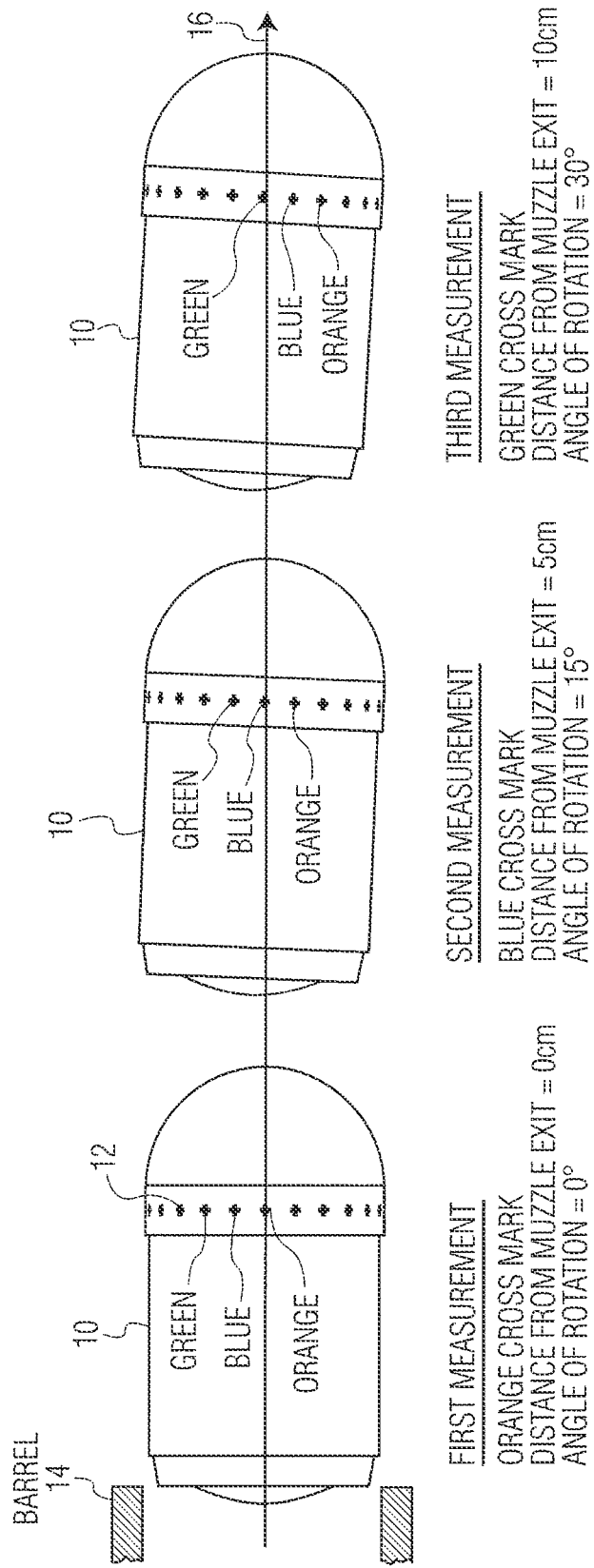
FIG. 2 is a time sequence diagram showing a projectile, provided with markings according to the invention, leaving the barrel of a weapon.

FIG. 2 shows a projectile 10 provided with markings 12 according to the present invention. The projectile is shown leaving the barrel 14 of a weapon and progressing along the path of the barrel axis 16 where it is viewed at three successive moments in time.

The marks 12 on the projectile are arranged in a circular row around projectile body transverse to the projectile axis. In this case, the marks are cross-shaped, making identification easier by character (pattern§ recognition. The marks can also have other various distinctive patterns and shapes so that the system can discriminate between the different marks.

In the projectile of FIG. 2 some of the marks have distinctive colors such that an optical detector can discriminate between the marks of different color.

For better visibility amid the muzzle flash, the marks may be imprinted with a dye that is luminescent when illuminated by radiation of a particular frequency.

As may be seen in the diagram, three measurements are made by viewing the projectile at successive instants of time. By viewing angular positions of the colored markings it is possible to determine the projectile spin. By determining the successive distances from the barrel it is possible to determine the muzzle velocity.

Figure 3:
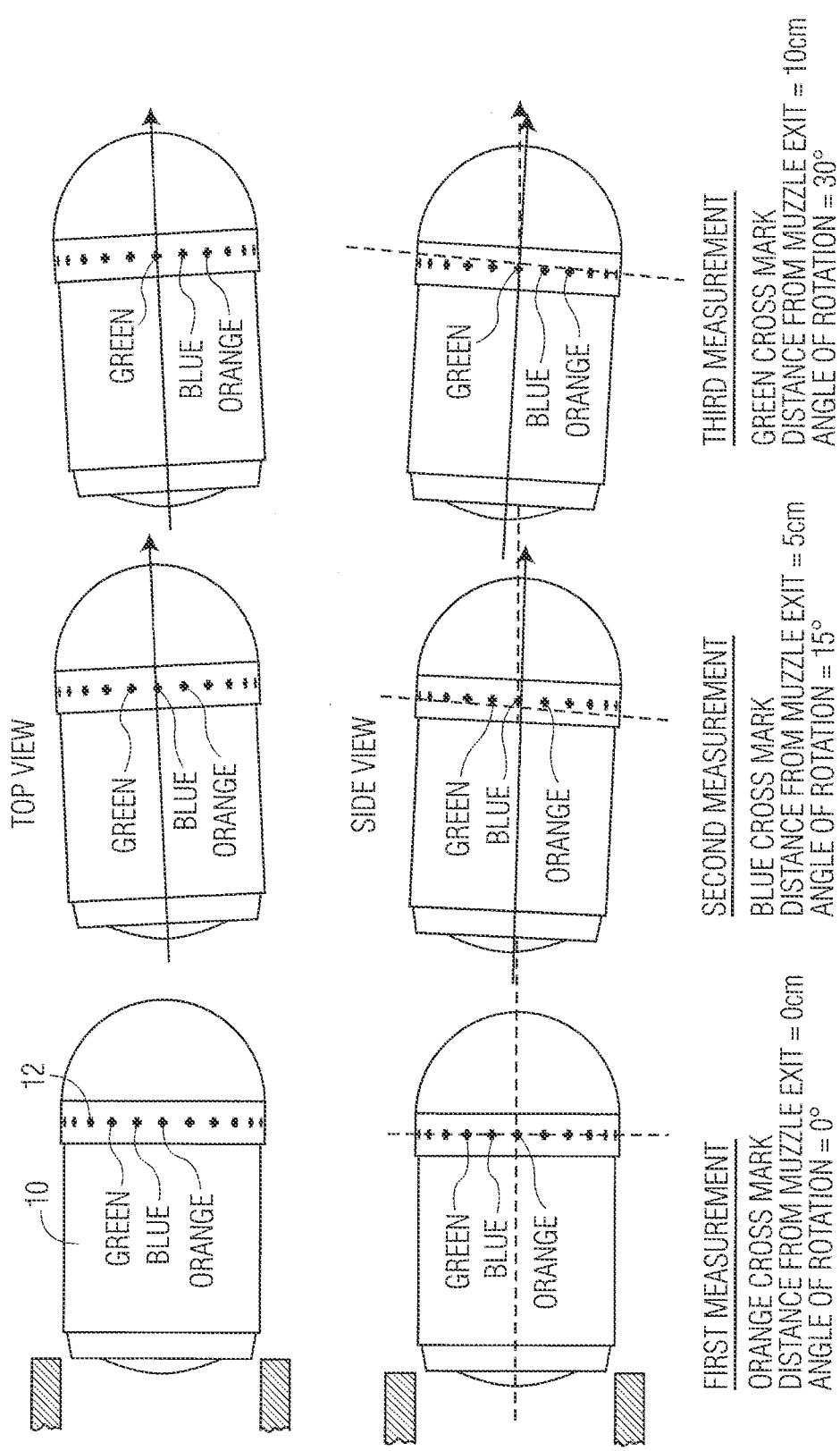
FIG. 3 is a top and side view of the projectile of FIG. 2 showing rotational axis changes.

FIG. 3 is a diagram, similar to FIG. 2, which shows the projectile from two vantage points that are angularly spaced by 90°; that is, a top view and a side view. By means of this additional point of view it is possible to more completely determine the projectile yaw at the successive instants of time.

By determining the yaw, spin and muzzle velocity at successive instants of time it is possible to determine the rate of change of these parameters.

Figure 4:
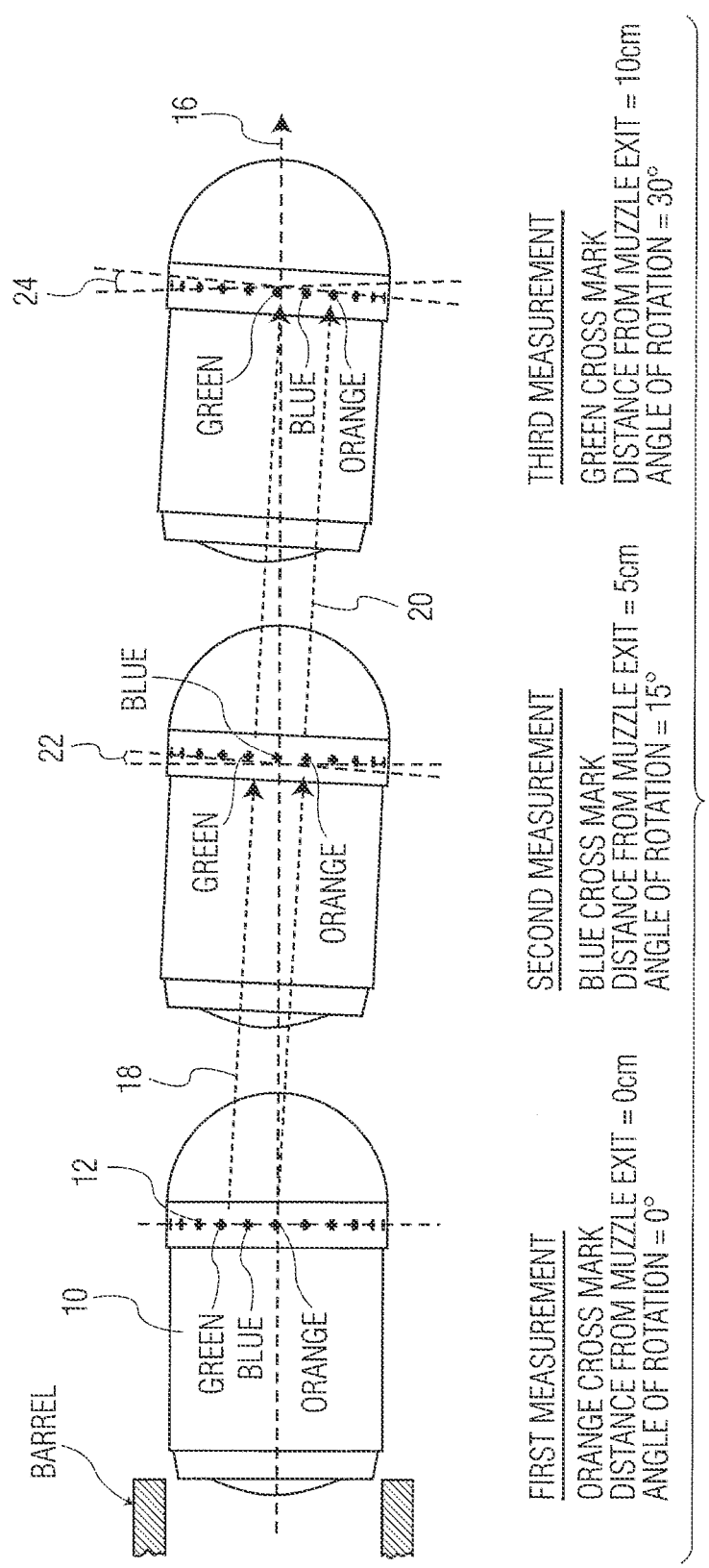
FIG. 4 is a side view of the projectile of FIG. 2 showing successive angles of yaw.

FIG. 4 is still another diagram showing the projectile 10 with markings 12 viewed in three successive instants of time. The spin of the projectile may be seen by observing the marks 12 which rotate, as indicated by the dashed line 18, which intersects a common mark in the three images, and 20 which intersects another. In addition, the yaw may be observed by comparing the positions of a line intersecting all the marks on each projectile with a line transverse to the central axis 16. In FIG. 4, the angle of yaw is seen to be increasing from the first image (no angle of yaw), to the second (small angle 22) and to the third (larger angle 24).

Figure 5:
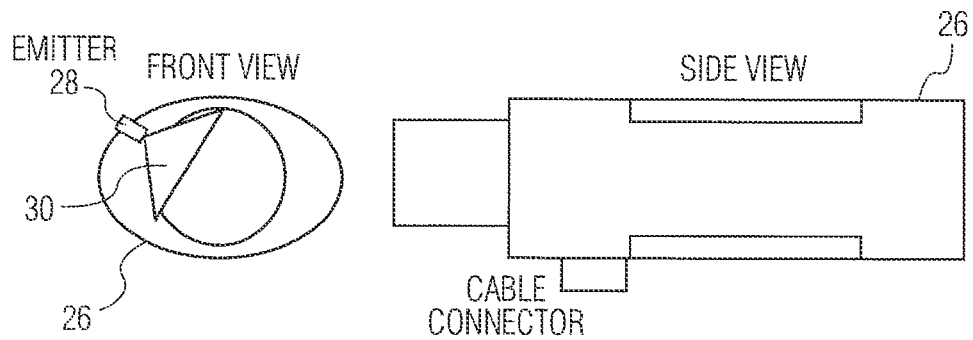
Figure 6:
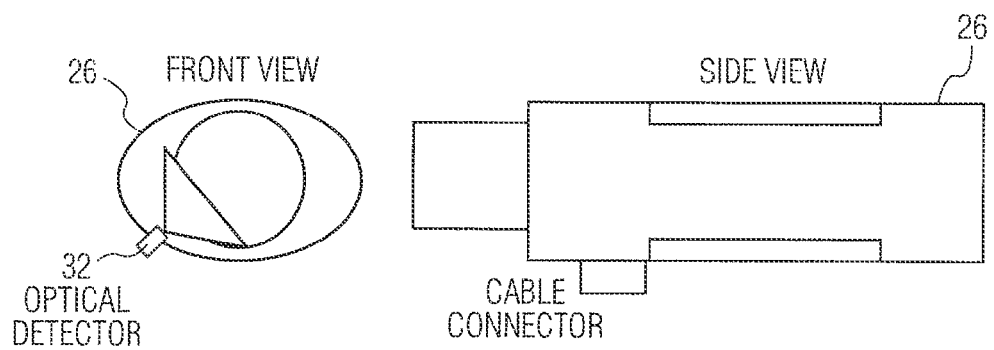
Figure 7:
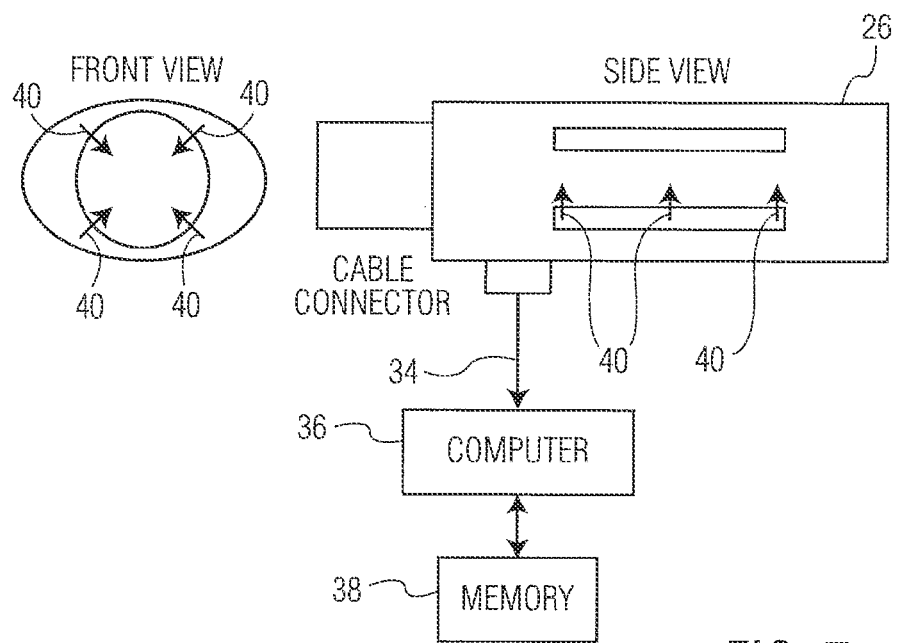

A system for measuring the three projectile parameters—yaw, spin and muzzle velocity—as well as the rates of change of these parameters, is represented in FIGS. 5-7.

FIGS. 5 and 6 are representational diagrams of a flash suppressor 26 for a 40 mm automatic grenade launcher (AGL) showing both front and side views in cross-section.

In FIG. 5 an emitter 28 emits a momentary flash illumination 30 as the projectile passes through, electronically triggered by the firing mechanism of the weapon. The emitter repeats the flash illumination one or more times (preferably resulting in three flashes altogether) thus "freezing" the projectile at successive instants of time.

In FIG. 6 one or more optical detectors 32 capture an image of the projectile at the successive instants of time. The optical detector is preferably a CCD camera which is triggered to view the projectile during successive windows of time that overlap with the instants of flash illumination. Advantageously, three separate cameras may be aligned in spaced positions along the central axis to capture images as shown in FIG. 2, but a single camera may suffice to capture all three images.

Advantageously one or more additional cameras 32 may be aligned along the central axis to view the projectile from a different vantage point and capture images of a different side of the projectile as shown in FIG. 3.

FIG. 7 illustrates a complete system comprising a flash suppressor 26 incorporating one or more emitters 28 and one or more optical detectors 32, coupled via a cable connector 34 to a computer 36 with an associated memory 38. By way of example, positions of the emitters 28 and detectors 32 are shown by arrows 40 in both the front view and side view of the suppressor.

In operation, signals representing the digital images captured by the detectors 32 are passed to the computer for processing. The computer performs character recognition on the markings of each projectile and calculates the yaw, spin and muzzle velocity of the projectile. The results are recorded in the memory 38 for use by the fire control system which then calculates the expected ballistic path of the next projectile to be launched.

The operation of the system according to the invention will now be described with reference to FIGS. 8-14. These figures are all representative diagrams of a flash suppressor at different stages while a projectile passes through.

Figure 8:
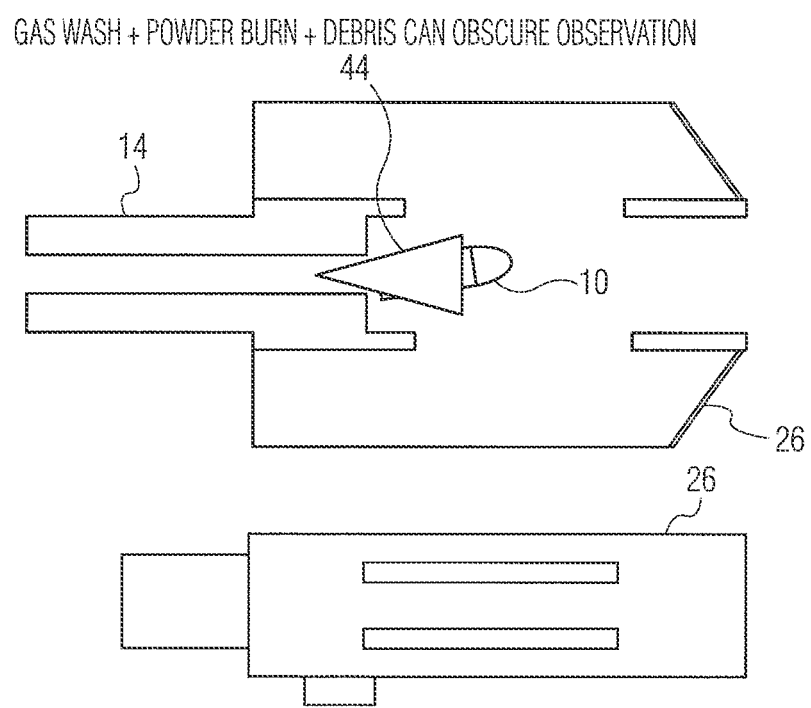

FIG. 8 shows a flash suppressor 26 attached to the barrel 14 of a gun at the moment a projectile 10 emerges from the muzzle. When this occurs, gas wash, burned powder and other debris emerge with it, obscuring visibility in the suppressor chamber.

Figure 9:
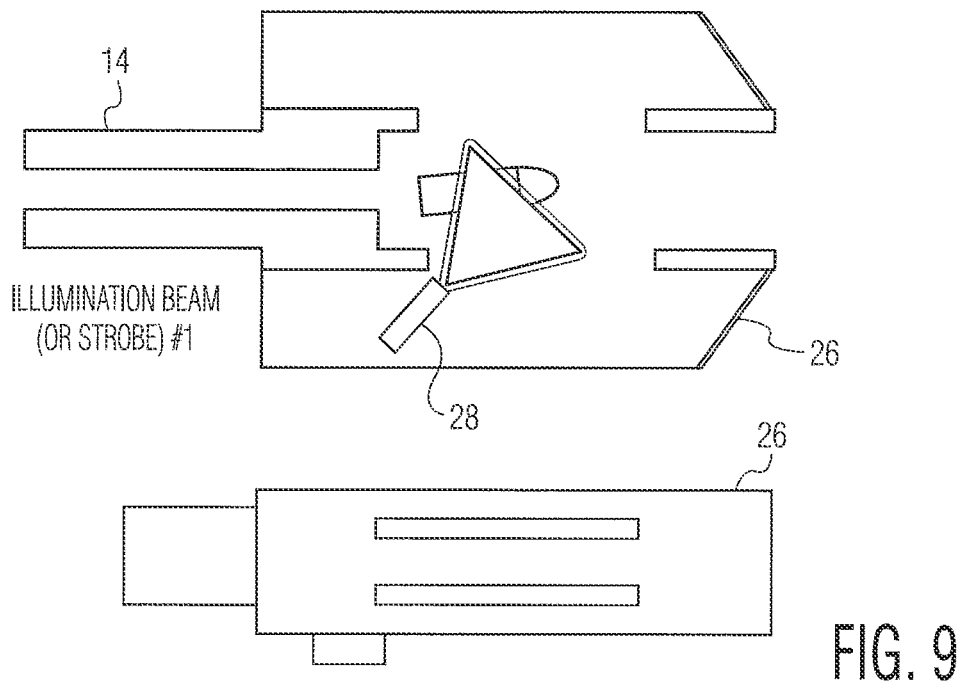
Figure 10:
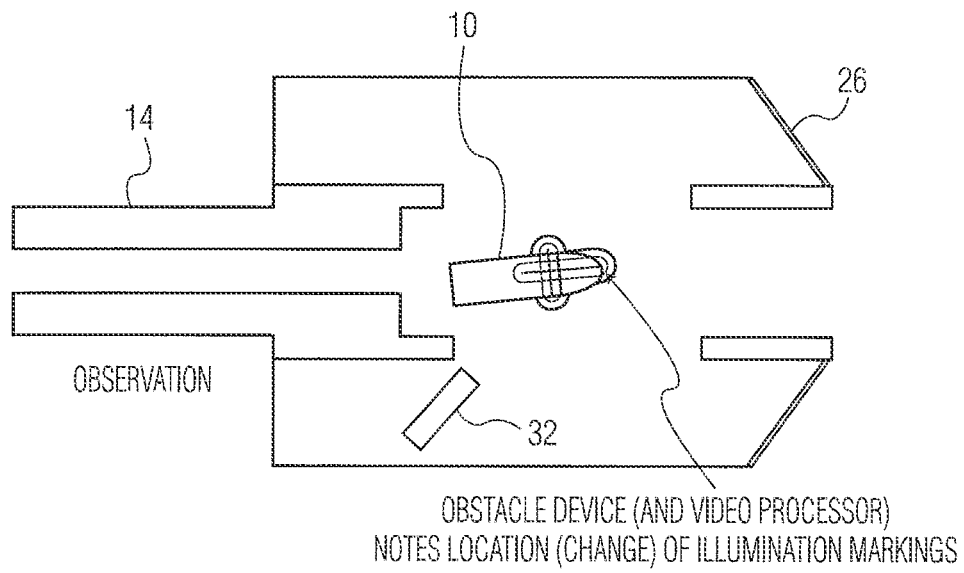

FIGS. 9 and 10 illustrate capturing an image of the projectile using the stop-action flash photography. The image capture occurs a short time after the initial launch, illustrated in FIG. 9, when the blast of debris has passed by the projectile 10, leaving the projectile visible to an electronic imager 32 when illuminated by an emitter 28.

Figure 11:
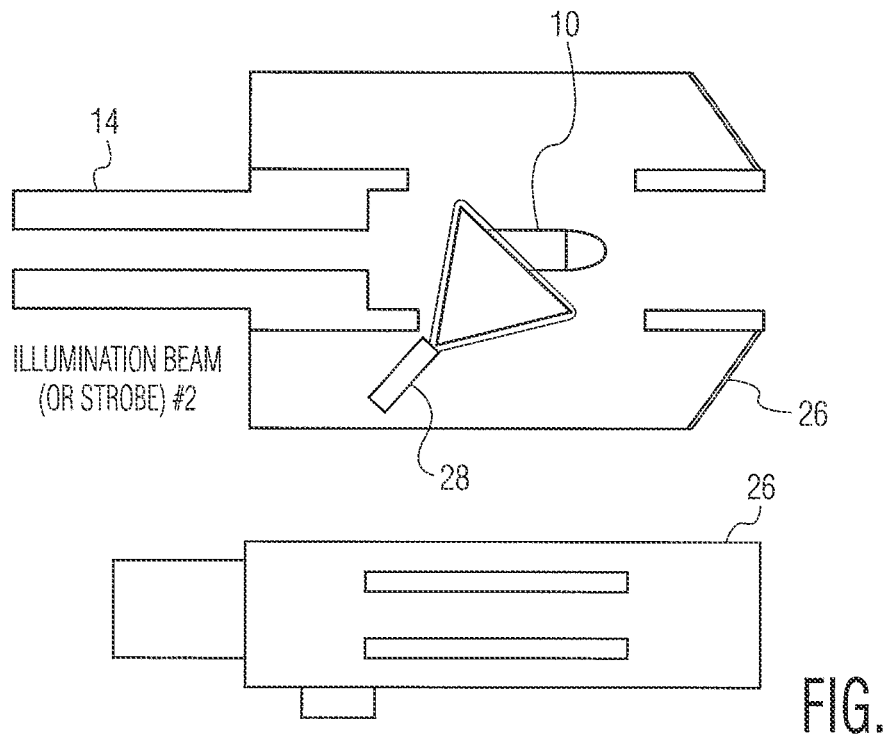
Figure 12:
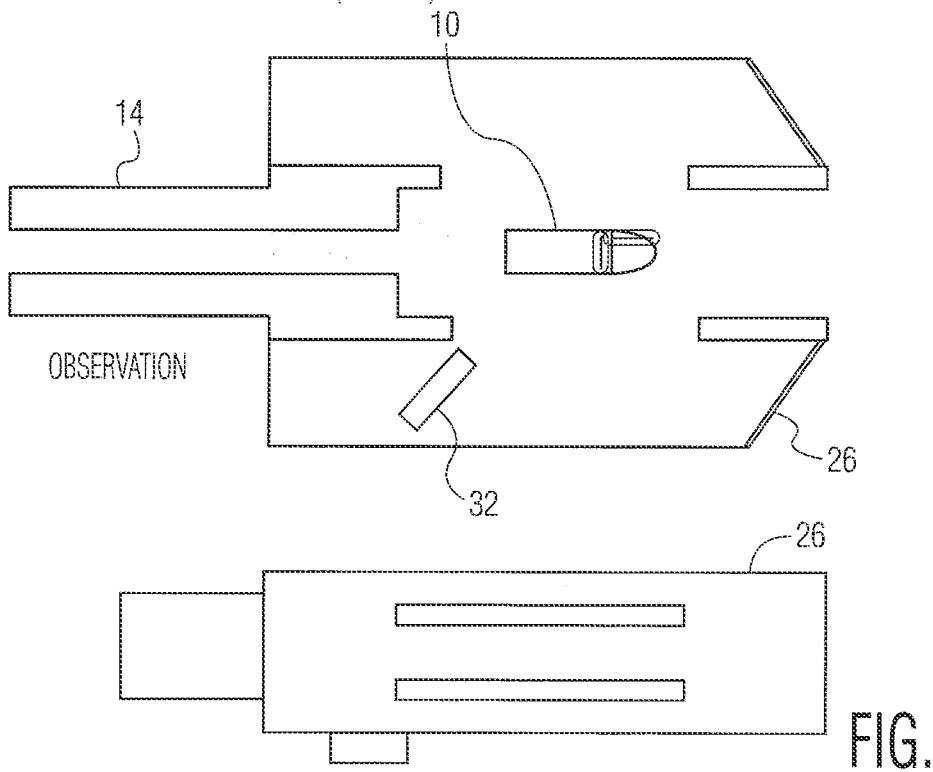
FIG. 12 is a schematic view of the flash suppresser of FIG. 13 showing the image capture of markings on the projectile in the second position.
Figure 13:
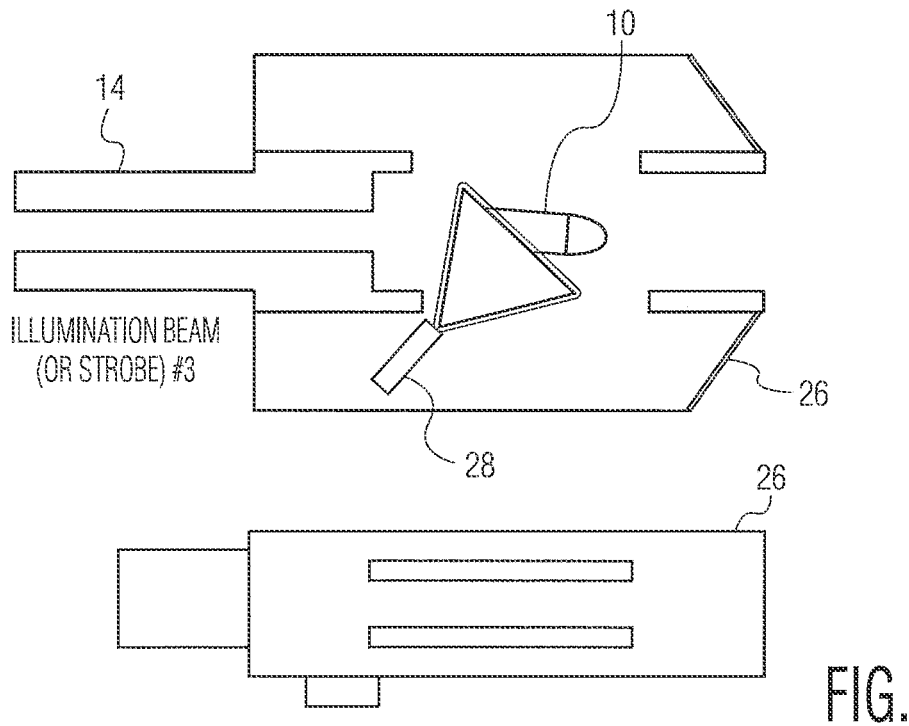
FIG. 13 is a schematic view of a flash suppresser showing the flash illumination of a projectile in a third position.
Figure 14:
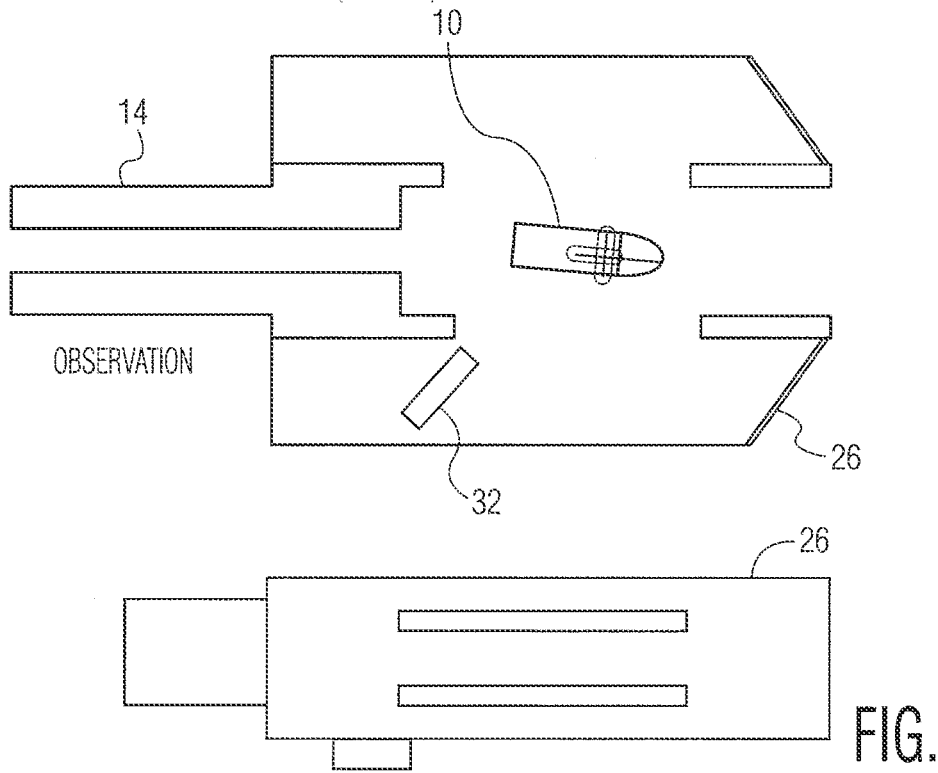
FIG. 14 is a schematic view of a flash suppresser of FIG. 15 showing the image capture of markings on the projectile in the third position.

FIGS. 11 and 12 illustrate the capture of a second image of the projectile at a second, successive instant of time. Similarly, FIGS. 13 and 14 illustrate the capture of a third image at a third successive instant of time. The markings on the projectile are recognized and their positions from one instant to the next are compared in the computer to determine the projectile's yaw, spin and muzzle velocity.

Figure 15A:
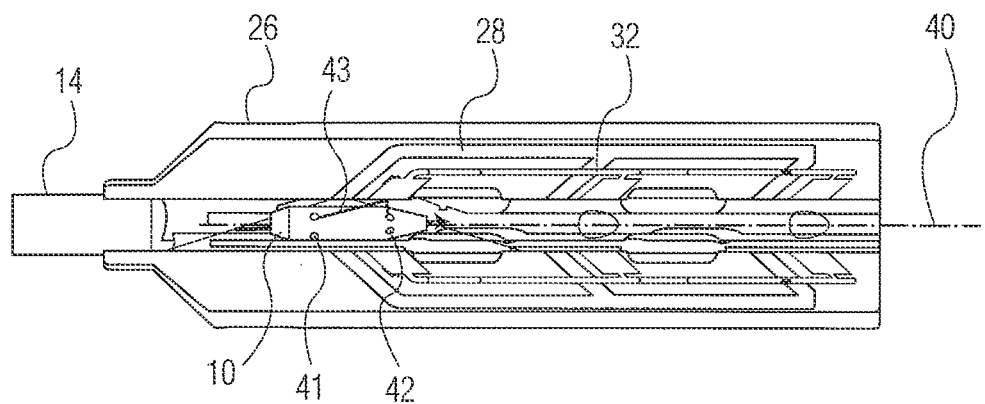
FIGS. 15a, 15b, 15c and 15d are cutaway views of a flash suppressor at successive instants of time as a projectile is launched and imaged as it passes through the device.
Figure 15B:
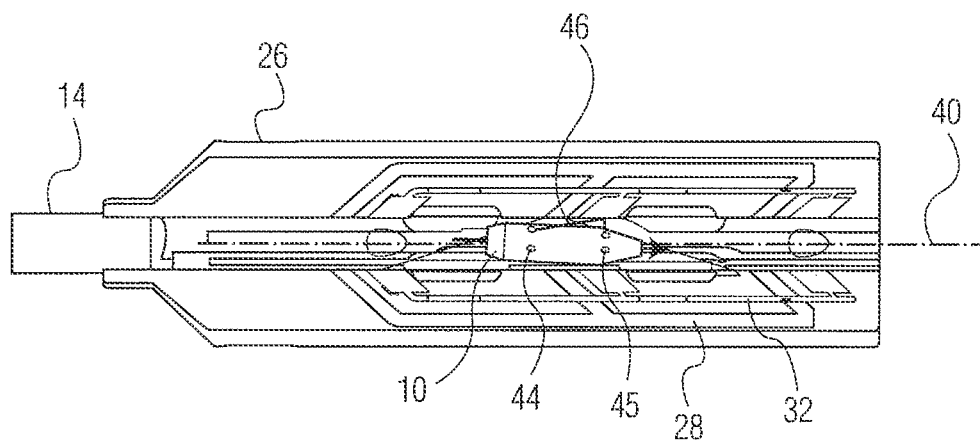
Figure 15C:
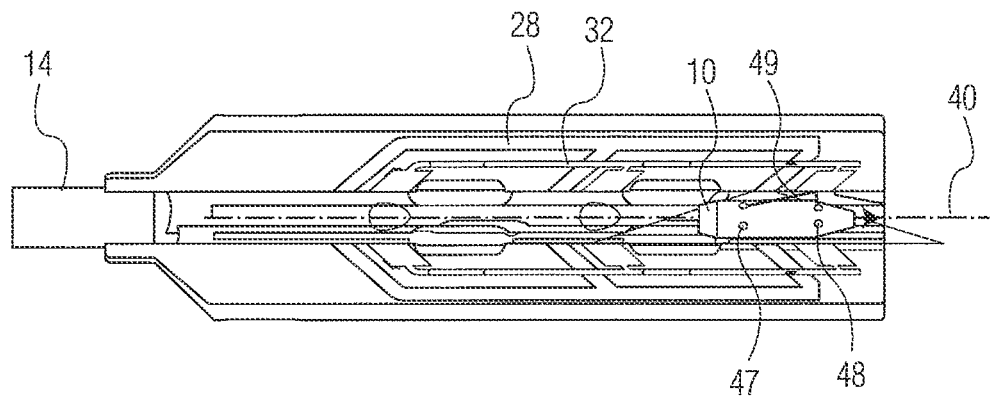
Figure 15D:
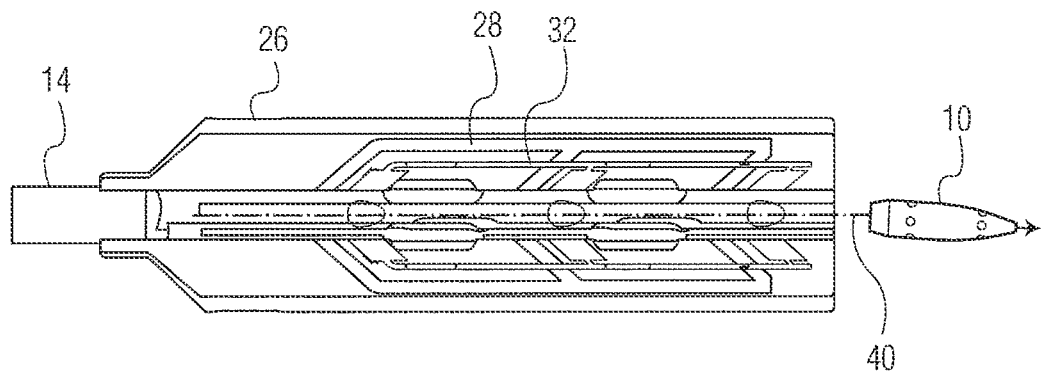

FIGS. 15a through 15d show the flash suppressor 26 incorporating the system of the present invention at successive instants of time as a projectile 10 passes through it along a central axis 40. In FIG. 15a the projectile is seen leaving the barrel 14 of the gun and being imaged in a first strobe flash. The positions of markings 41 and 42 near the front and the rear, respectively, of the projectile are captured and identified as indicated by the arrow 43. In FIG. 15b markings 44 and 45 are identified as indicated by arrow 46 and in FIG. 15c markings 47 and 48 are identified as indicated by arrow 49. FIG. 15d shows the projectile 10 with a slight yaw as it leaves the flash suppressor 26.

Figure 16A:
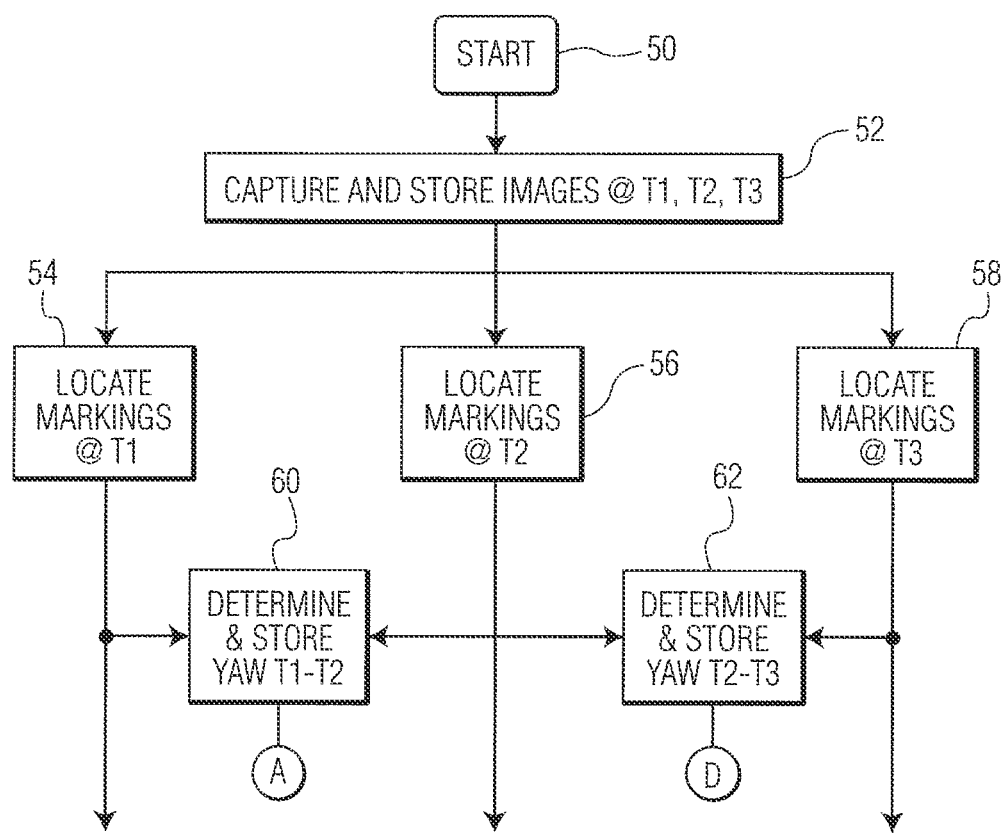
FIGS. 16a and 16b constitute a flow chart showing the operation of the system according to the present invention.
Figure 16B:
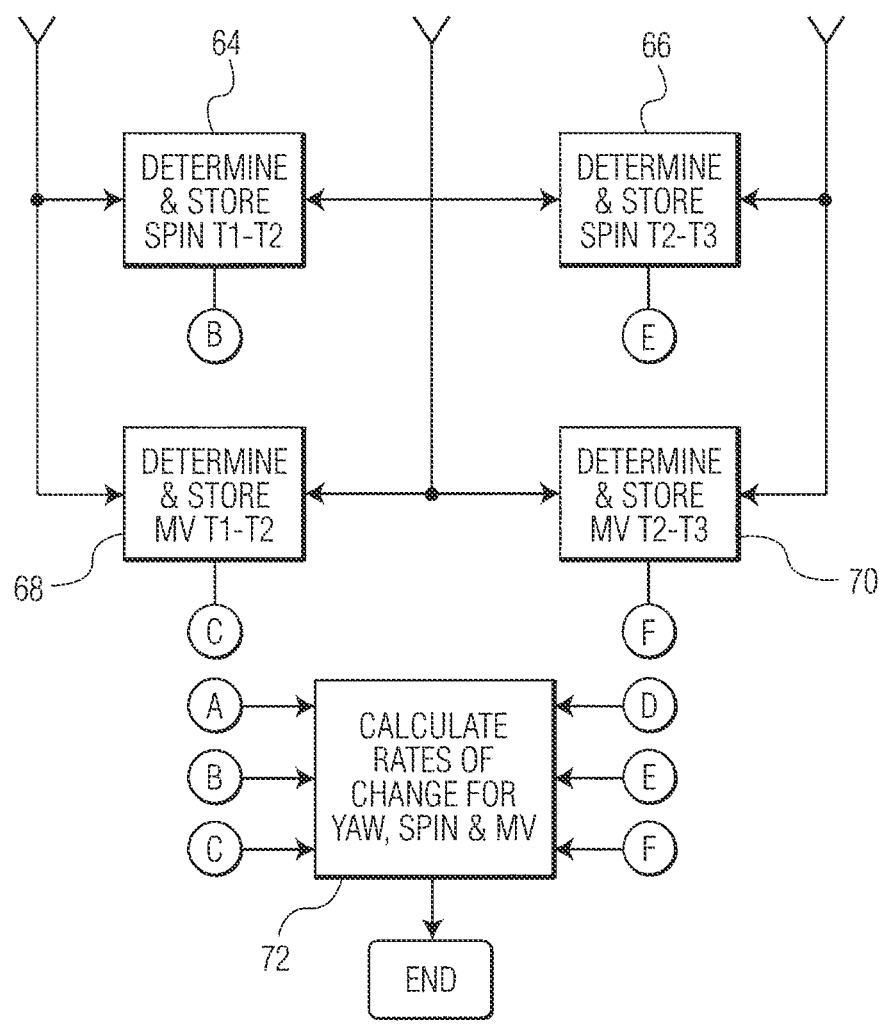

The computer 36, controlled by software, operates according to an algorithm as represented by the flow chart of FIGS. 16a and 16b. The program starts at block 50 upon receipt of a trigger signal that fires the projectile 10 at time T0. Three successive images of the projectile are captured by flash photography and stored in the memory 38 at times T1, T2 and T3, respectively (block 52). The computer processes the signals defining each image in turn (blocks 54, 56 and 58) to recognize the markings on the projectile and determine and store the coordinates of these markings as they appeared at times T1, T2 and T3. Once the locations of the markings are available, the computer calculates and stores the projectile's yaw, spin and muzzle velocity (MV), respectively, by determining changes in the marking locations, first between times T1 and T2 and then between times T2 and T3 (blocks 60-70). Once all these parameters are available (outputs A, B, C, D, E and F) the computer calculates the changes in yaw, spin and MV and determines their respective rates of change (block 72).

Kit for programmable airburst ammunition: A kit, added to or incorporated into a weapon, provides an apparatus and methodology to (1) measure a projectile in transit within the barrel or transiting a muzzle break, (2) where the apparatus receives electronically transmitted information from an external device with range information that is passed to (3) a ballistic calculator that calculates an optimum flight time for a projectile with that measured velocity which, in turn, (4) exits the muzzle break and reaches a programming station where (5) an encoded time of flight instruction is transmitted to the projectile and the projectile follows its ballistic path and detonates at the prescribed flight time.

Figure 17:
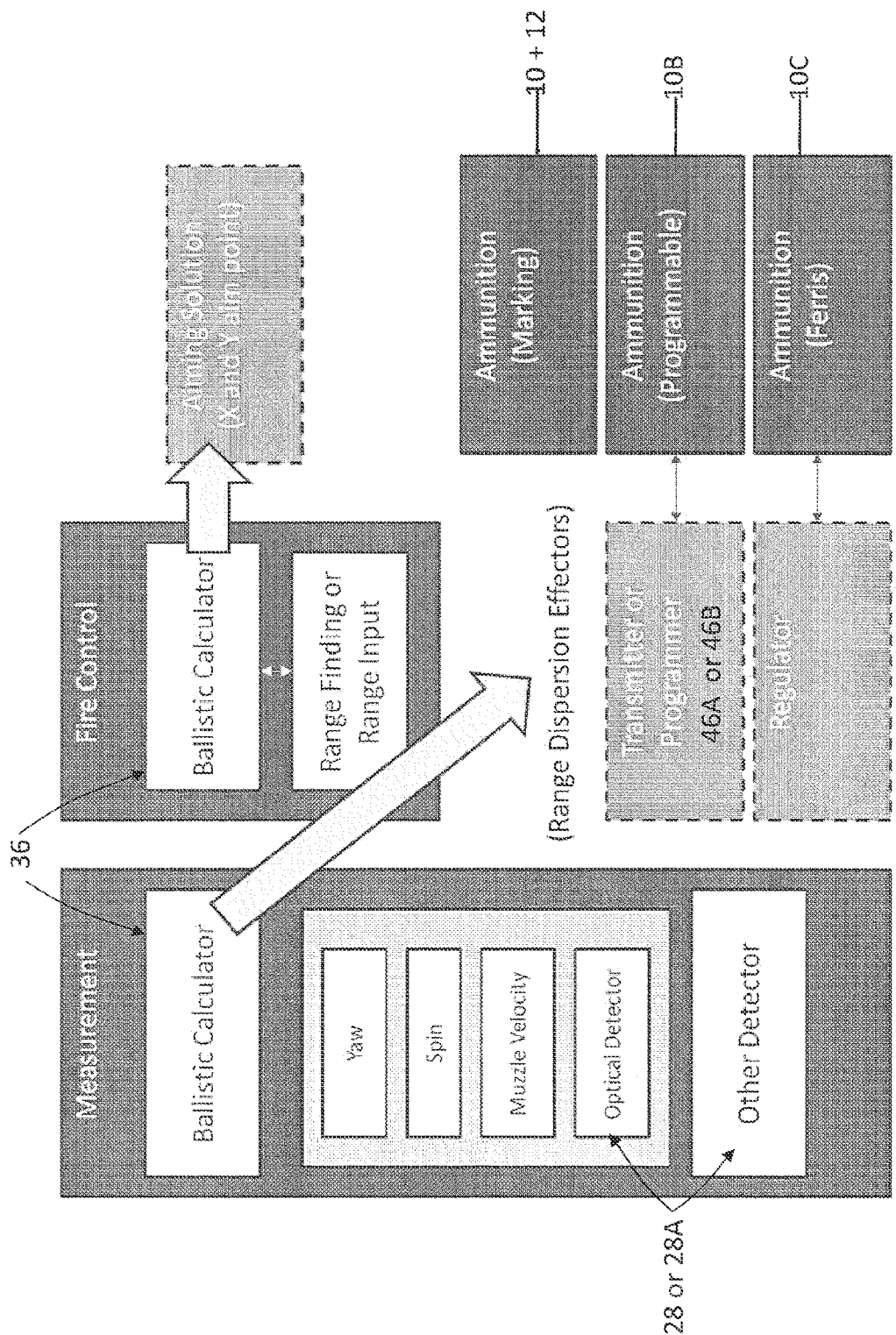
FIG. 17 is a block diagram illustrating key components that can, in various configurations, be incorporated into kits according to the invention.

FIG. 17 is a diagram depicting key sub-systems and inter-relationships among sub-system that measure "muzzle exit conditions" and in using a ballistic calculator thereby improve the horizontal (y) and vertical (x) range aiming—or in combination measuring muzzle exit conditions to then use two different techniques effect (1) conventional projectiles with a ferrous nature or (2) air-bursting programmable projectiles to reduce shot-to-shot range (z) errors.

FIG. 18A depicts a kit where range information is provided to a ballistic calculator and upon firing a projectile is measured using prior art techniques 28A or an optical measurement as disclosed hereinabove (not depicted on FIG. 18A). The figure also depicts an optical programmer 46A affixed to a muzzle break 26 attached to a barrel 14. The ballistic calculator is protected in a housing 52 fixed to the flash suppressor 26. An emitter or programmer 46A transmits and optical signal 48A to the projectile to program an optically programmed air-burst projectile 10A.

FIG. 18B depicts a kit where range information is provided to a ballistic calculator and, at firing, a projectile is measured using prior art techniques 28A or an optical measurement as disclosed hereinabove (not depicted on FIG. 18B). The drawing also depicts an RF programmer or transmitter 46A affixed to a muzzle break 26 attached to a barrel 10. The ballistic calculator is protected in a housing 52 affixed to the flash suppressor 26. An emitter or programmer 46B transmits an RF signal 48B to the projectile to program a programmed air-burst projectile configured for RF programming 10B.

FIG. 18C depicts a weapon crew consisting of a gunner 56 and an assistant gunner 58 with a hand-held laser range finder 44B. In this configuration, the laser range finder transmits range to target information 44 via wireless or tethered galvanic contact to the ballistic calculator connected to or incorporated into a flash hider, flash suppressor or muzzle break 26.

FIG. 19A depicts the methodology 52 to first measure a projectile transiting a barrel or muzzle break using an optical technique 28 disclosed hereinabove or a technique using a prior art device 28A.

FIG. 19 depicts subsequent step where, after measurement of the muzzle velocity, the range to target information 44 (not depicted) is in memory or transmitted to a ballistic calculator 36 to calculate an optimum time-of-flight (or time to detonate) an air-burst programmable projectile 10A or 10B.

FIG. 19C depicts the transit and time delay incorporated into the device where a programmable projectile 10A or 10B transits from the flash suppressor 26 to an optimized post-shot programming station 48 outside of the weapon. The programming station is in an area forward of the muzzle, flash hider or suppressor where the air-burst projectile has an optimized reception of a programming signal. Upon flying into the programming station 48, the ballistic calculator, 36 initiates transmission of either an RF or an optical signal in the direction of the programmable ammunition 10A or 10B such that the ammunition receives a programming signal with the requisite time of flight via optical or RF transmission (depicted previously in FIGS. 18A and 18B).

FIG. 20A illustrates a muzzle velocity measurement 28 or 28A and transmitter (programming device) 46 where the measurement device is mounted on the flash suppressor, flash hider or muzzle break 26 and where the optical programmer 46A is fitted to the side of a barrel allowing for transmission of a signal to the projectile. This diagram also illustrates a key sequential step 52 where the device sequentially measures muzzle velocity 28 or 28A, a ballistic calculator 36 calculates the requisite time to target and, upon reaching a programming station 48, the ballistic calculator instructs an optical transmitter 46B to transmit a signal 48A to the projectile at the programming station 48.

FIG. 20 illustrates a muzzle velocity measurement 28 or 28A, and transmitter 46A where the measurement device is mounted on the muzzle break and where the RF programmer 48B is fitted to the flash suppressor, flash hider or muzzle break 26. The diagram also illustrates the key sequential step 52 where the device sequentially measures muzzle velocity 28 or 28A, a ballistic calculator 36 calculates the requisite time to target and a optical transmitter 46B transmits and signal 48A to a projectile at the programming station 48.

FIG. 21A depicts a programmable projectile 10A or 10B that is fired from a ground platform where the projectile detonates after passing a target 70 and where the fragments 74 spread rearward at a high velocity to impact the target. In this case a kit may allow a weapon operator to add milliseconds to the programmed time of flight (programmed time to detonation) so that the projectile 10A or 10B passes the target 70 and detonates, sending fragments 74 rearward to impact the target 70. The laser return to a range finder 72 provides range information prior to firing.

FIG. 21B represents a detonating projectile 70, fired from a ground platform where a programmable projectile 10A or 10B detonates short of the intended target and where the fragments 74 continue to move forward at a high velocity to impact on a target 70. In this case a kit may allow a weapon operator to reduce milliseconds from the programmed time of flight (programmed time to detonation) so that the projectile 10A or 10B detonates before reaching the target, but within the burst radius of a projectile so that fragments 74 impact the target 70. The laser return to a range finder 72 provides range information prior to firing.

FIG. 21C represents a detonating programmable projectile 10A or 10B, fired from an aircraft, helicopter or drone that is programmed to burst forward of the target and where the fragments 74 travel forward to impact the target 70. In this case the kit may allow a weapon operator to reduce milliseconds from the programmed time of flight (programmed time to detonation) so that the projectile 10A or 10B detonates before reaching the target, but within the burst radius of a projectile so that the fragments 74 impact the target 70. The laser return to a range finder 72 provides range information prior to firing the projectile.

Muzzle velocity measurement and regulation kit: The system utilizes a methodology to (1) measure a projectile in transit within the barrel or transiting a muzzle break, (2) where an external source allows for selection of a type of ammunition with a corresponding magnetic profile, and (3) where a calculator identifies and controls a force profile that is applied to a projectile to slow the projectile, such that (4) the projectile exits a muzzle at a repeatable, consistent muzzle velocity.

The device may harvest energy from the slowing projectiles to charge a capacitor and thus recycle electrical power in the device.

FIG. 22 depicts a normal distribution 82 of muzzle velocities that corresponded to a projectile's normally identified muzzle velocity variation normally expressed in feet per second.

FIG. 23 depicts a ferrous projectile 10C traversing in a barrel a flash suppressor, muzzle break, flash hider where the muzzle velocity is measured at 28 or 28A and the muzzle velocity measurement is transmitted to a ballistic calculator.

FIG. 24 depicts a target muzzle velocity set to slow or to accelerate projectiles so as to leave the muzzle at a precise velocity. This illustration depicts a system designer's selection of a target velocity 84 at the lower end of the normal distribution where the device will slow all exiting projectiles so that the projectiles have a consistent velocity.

FIG. 25 depicts a ballistic calculator 36 that controls a generator 92 which energizes a field 94 and applies a force 96 to a ferrous projectile 10C.

FIG. 26 depicts the coils reducing the exit velocity of a ferrous projectile 10C, where the slowing projectile generates magnetic force 99 and an electrical current that is stored in a capacitor 98 to recycle the energy for electronic devices associated with the weapon.

FIG. 27 depicts a ferrous projectile 10C departing the device at a precise muzzle velocity.

Figure 28:
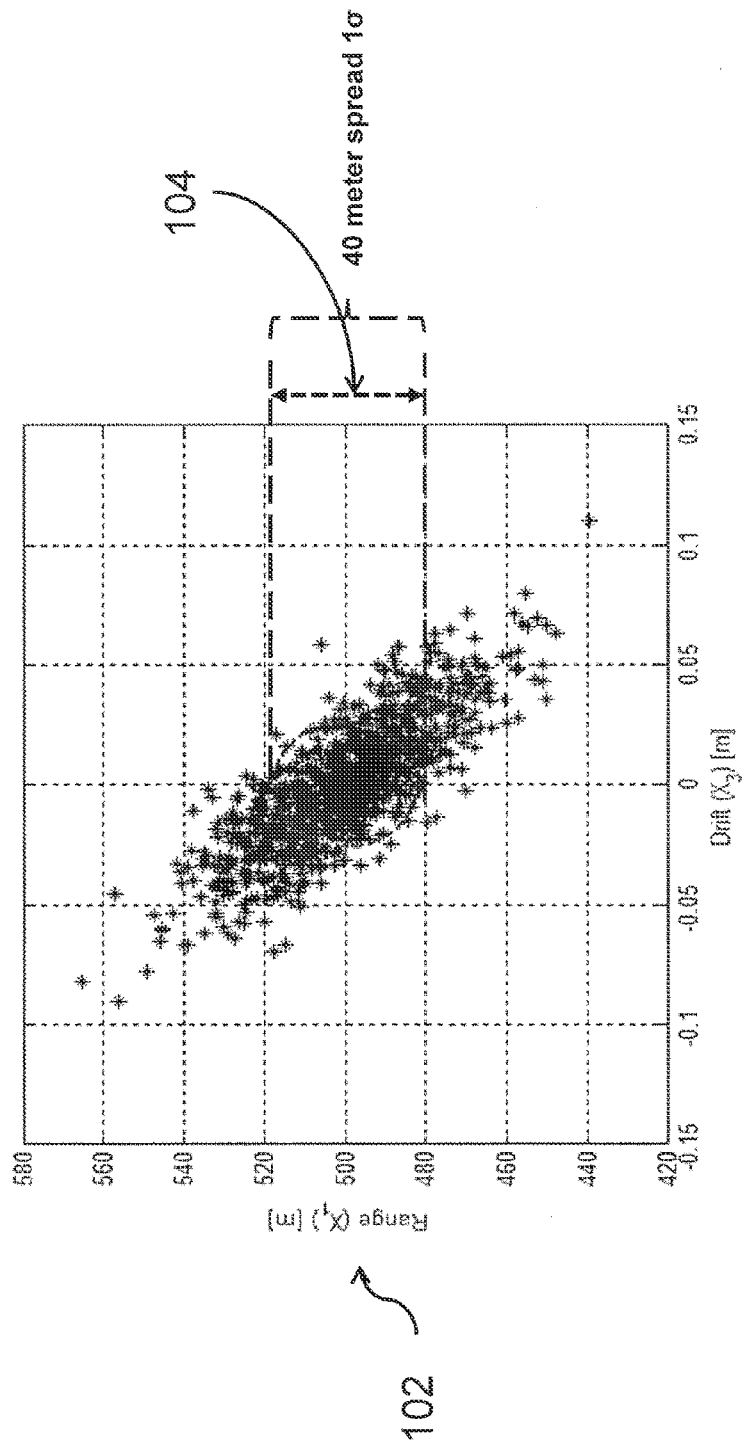
FIGS. 28A and 28B are shot diagrams showing horizontal and vertical shot variations at 500 meters.
Figure 28:
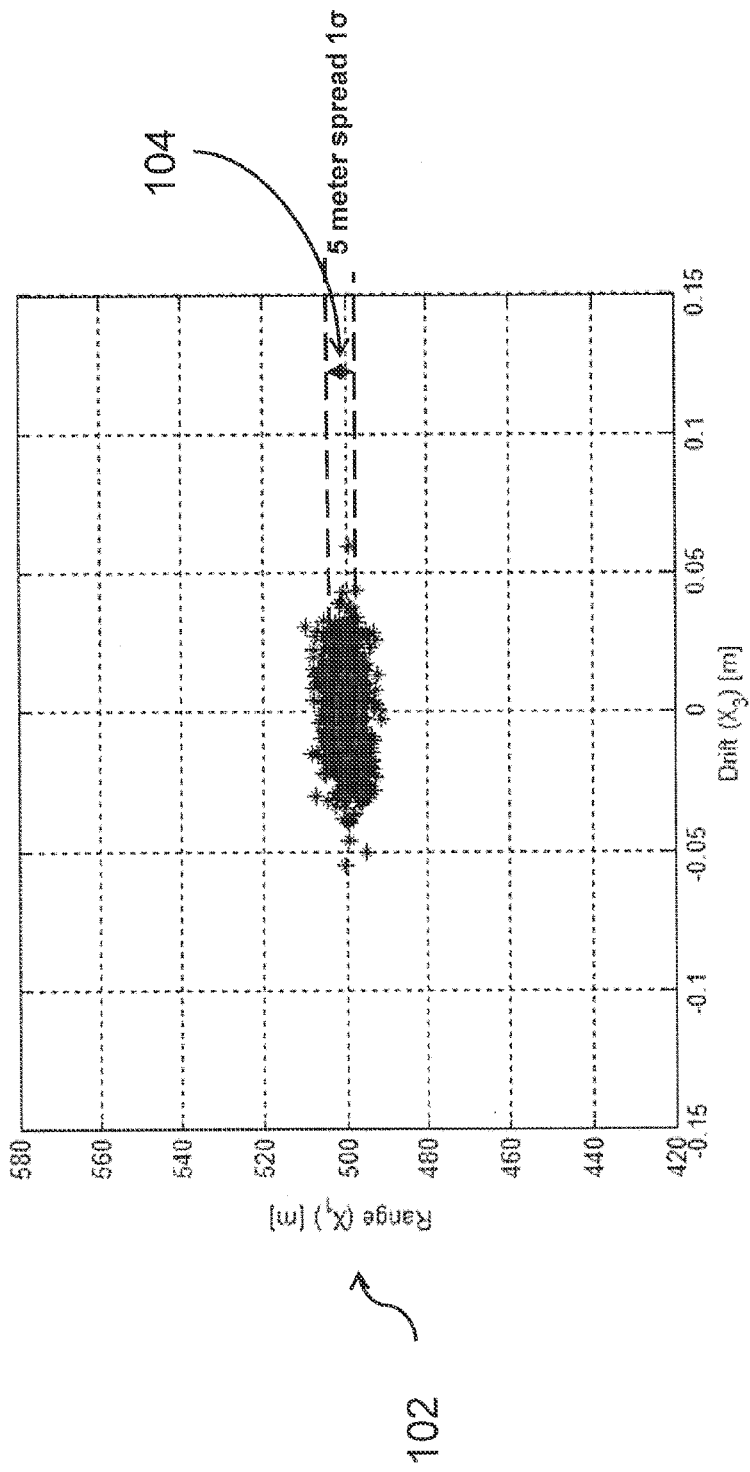

Simulated impact with precise detonation: With either approach the projectiles will impact with reduced dispersion. The reduction of range dispersion will enhance a 40 mm AGL's increasing the system's effectiveness. While wind will still degrade the performance and terminal effect of ammunition, FIGS. 28-30 illustrate the performance improvements in nominal standard conditions. FIGS. 28-30 illustrate Monte Carlo analysis for impact locations. Series A illustrates the current system dispersion of a 40 mm AGL where ammunition has a 5 meter per second muzzle velocity variation at 1σ (1 sigma). Series B illustrates the dispersion of detonation where a 40 mm air-burst ammunition is programmed post-shot where muzzle velocity is measured. Series B also depicts the dispersion of detonation where a 40 mm point detonating ammunition is slowed to a target velocity leaving the muzzle with a precise muzzle velocity.

FIGS. 28A and 28B depict the impact locations for 40 mm projectiles fired at a range of 500. FIG. 28A depicts the impact location (or detonation point) in a beaten zone (horizontal grid) of a Monte Carlo simulation with a muzzle velocity variation of 5 meters per second. FIG. 28B depicts the impact location (or detonation point) in a beaten zone (horizontal grid) of a Monte Carlo simulation where airburst ammunition is programmed post-shot or where the device regulates the exit muzzle velocity to fall within a precise range. Range dispersion is noted 102 vertically on the graph and 1σ (1 sigma) dispersion 104 is measured.

Figure 29A:
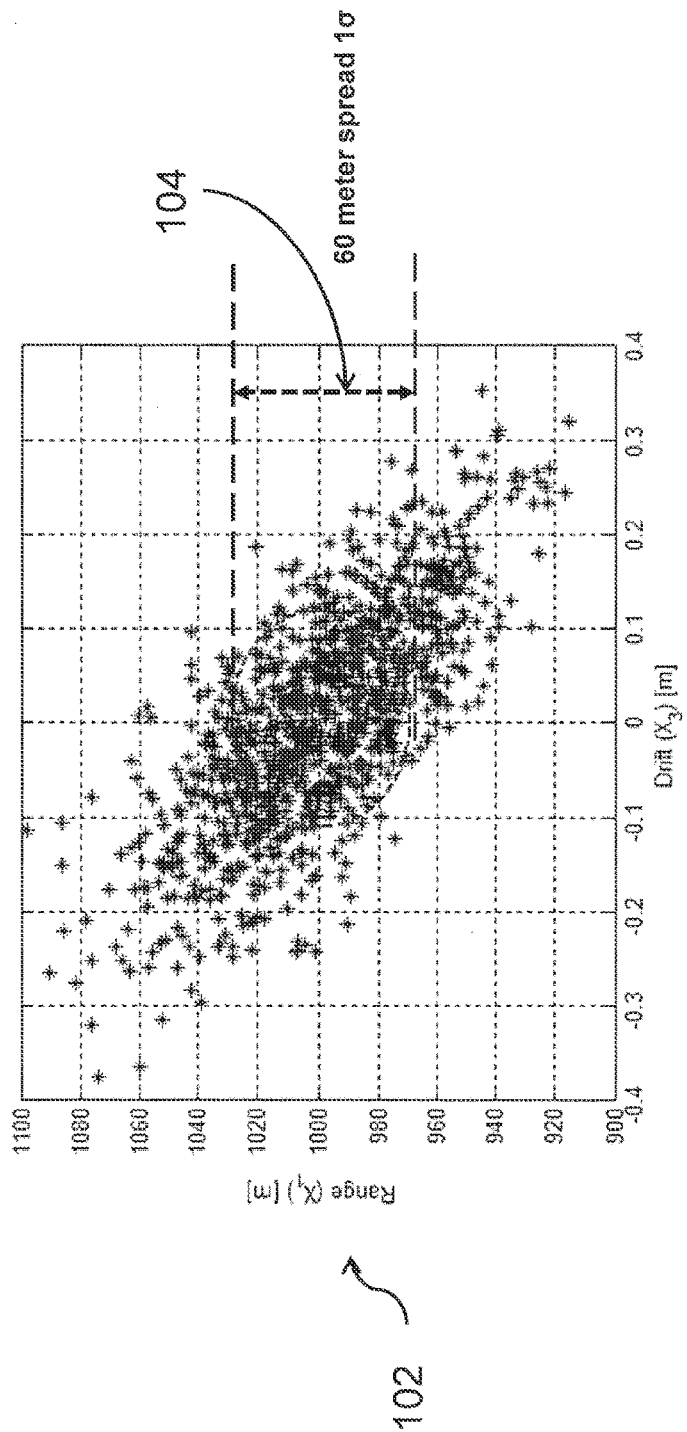
FIGS. 29A and 29B are shot diagrams showing horizontal and vertical shot variations at 1000 meters.
Figure 29B:
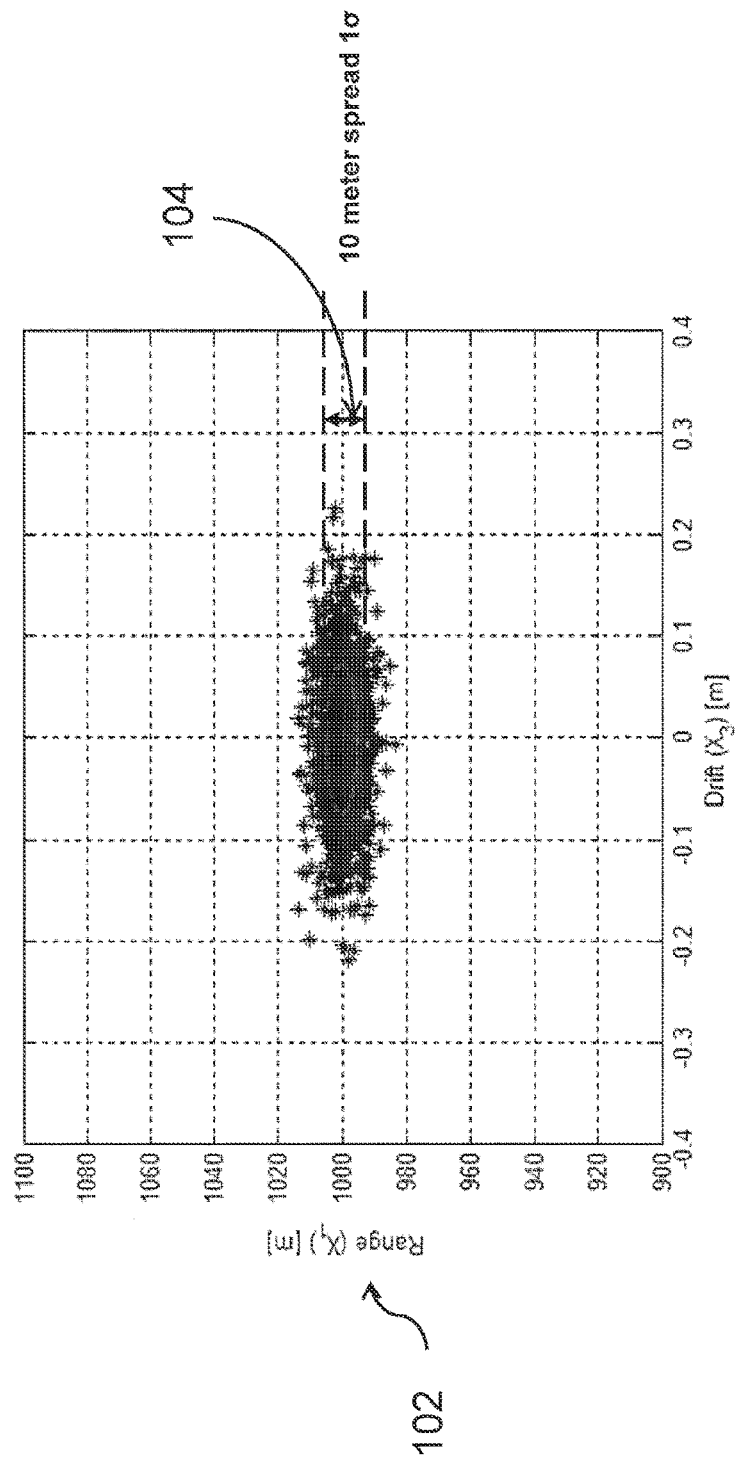
Figure 30A:
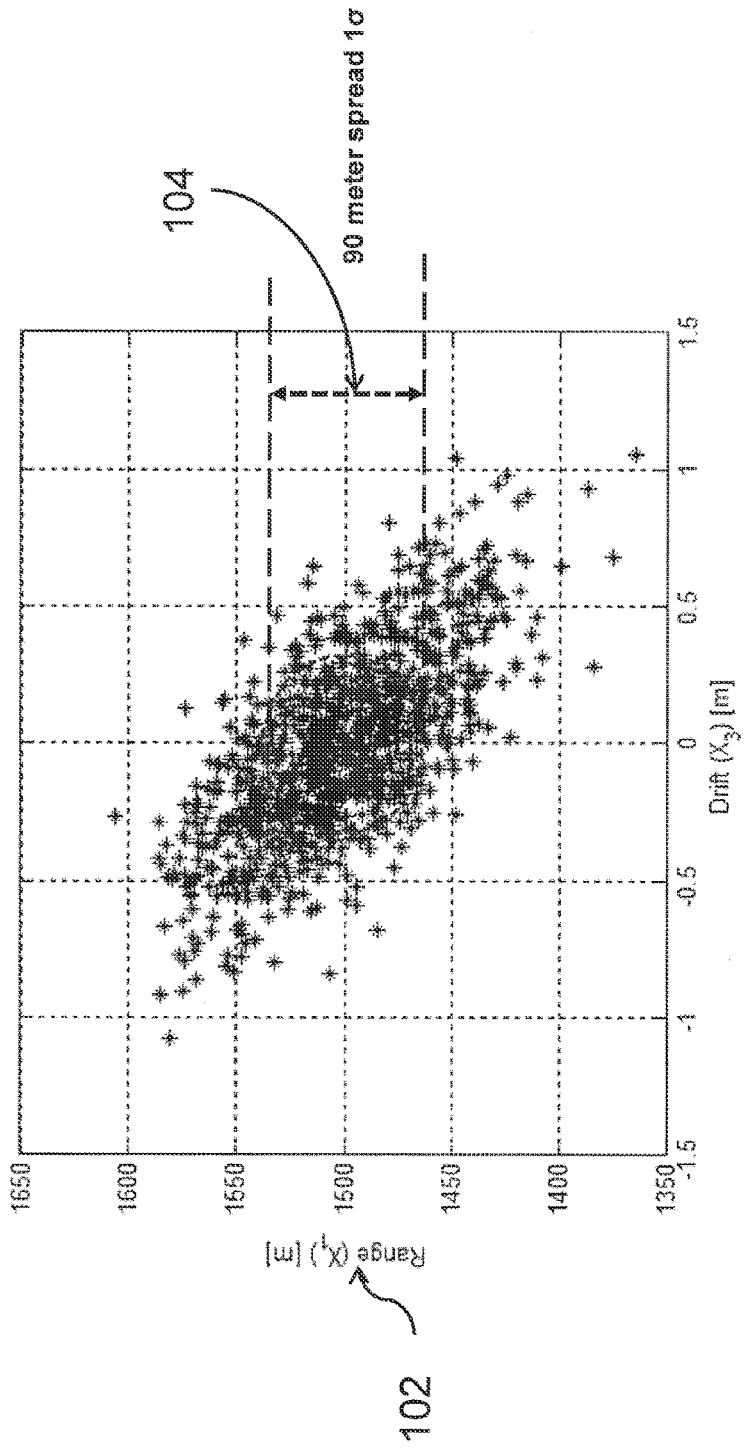
FIGS. 30A and 30B are shot diagrams showing horizontal and vertical shot variations at 1500 meters.
Figure 30B:
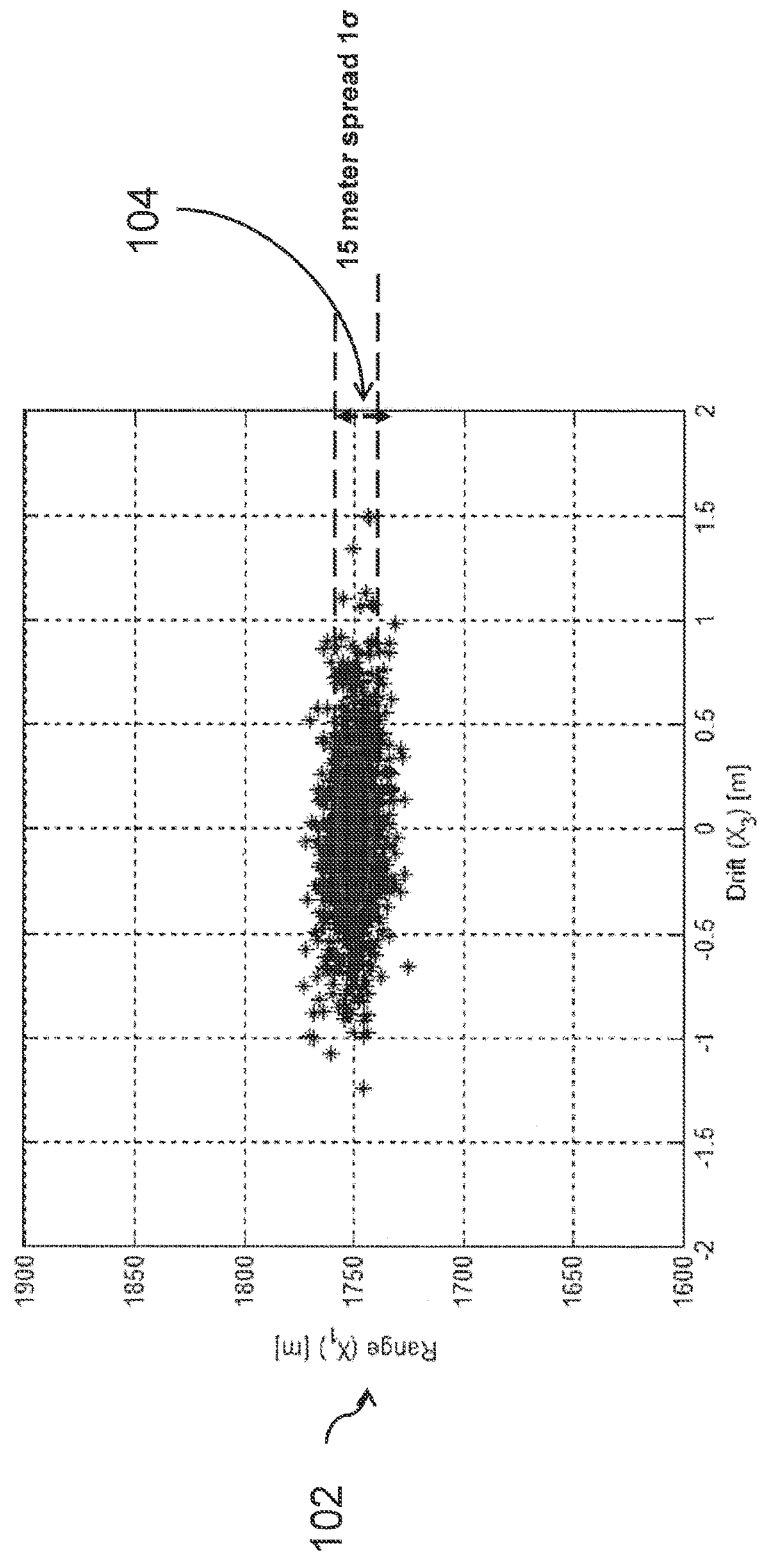

FIGS. 29A and 29B depict the impact locations for 40 mm projectiles fired at a range of 1000 meters. FIG. 29A depicts the impact location (or detonation point) in a beaten zone (horizontal grid) of a Monte Carlo simulation with a muzzle velocity variation of 5 meters per second. FIG. 29B depicts the impact location (or detonation point) in a beaten zone (horizontal grid) of a Monte Carlo simulation where airburst ammunition is programmed post-shot or where the device regulates the exit muzzle velocity to fall within a precise range. Range dispersion 102 is noted vertically on the graph and 1σ (1 sigma) dispersion 104 is measured. And finally, FIGS. 30A and 30B depict the simulated impact location of projectiles fired at a range of 1000 meters. FIG. 30A depicts the impact location (or detonation point) in a beaten zone (horizontal grid) of a Monte Carlo simulation with a muzzle velocity variation of 5 meters per second. FIG. 30B depicts the impact location (or detonation point) in a beaten zone (horizontal grid) of a Monte Carlo simulation where air-burst ammunition is programmed post-shot or where the device regulates the exit muzzle velocity to fall within a precise range. Range dispersion 102 is noted vertically on the graph and 1σ (1 sigma) dispersion 104 is measured.

There has thus been shown and described a novel system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

REFERENCE NUMBERS

10 Projectile
10A Optically programmable air-burst projectile
10B RF programmable air-burst projectile
10C Projectile with ferrous material
12 Marking on a projectile
14 Barrel
16 Direction of fire
18 Indexed projectile in spin
20 Indexed projectile in spin
22 Yaw measurement
24 Yaw measurement
26 Flash suppressor
28 In muzzle emitter (MV measurement)
28A Other in muzzle velocity measurement technique (Prior Art)
30 Light from in-muzzle break emitter
32 In-muzzle break optical detector
32 Projectile image
34 Connection to computer
36 Ballistic calculator or computer
38 Memory
40 Optical detectors (in muzzle break, flash hider or flash suppressor)
42 Mortar muzzle break
44 Range information
44A Fire control with a range finder
44B Hand-held laser range finder
44C Dial a range
46 Programming unit
46A Optical transmitter (or programmer)
46B RF transmitter (or programmer)
48 Programming station
48A Optical programming signal
48B RF programming signal
50 MV measurement device
52 Ballistic calculator or computer (housed in a flash suppressor, flash hider or muzzle break)
56 Gunner (operator) of a crew served weapon
58 Assistant (Operator) or gunner of a crew served weapon
70 Target
72 LRF reflection
74 Fragmentation from a detonating projectile
82 Normal dispersion of muzzle velocity
84 Target velocity within normal distribution
86 Effected impact dispersion (beaten zone)
90 System diagram
92 Generator
94 Coil generating a magnetic force
96 Force applied to slow projectile
98 Capacitor storing residual energy produced by Coil
102 Range dispersion
104 Resulting range dispersion

What is claimed is:

1. Projectile flight parameter measurement apparatus for a weapon having a gun barrel defining a central longitudinal axis extending between a breech end and an opposite, muzzle end, said weapon being operative to launch a projectile through said gun barrel, said flight parameter measurement apparatus comprising:
   (a) a tubular housing configured to be attached to the weapon to receive a launched projectile as it leaves the muzzle end of the gun barrel, said tubular housing having a longitudinal axis aligned with the central longitudinal axis of the gun barrel;
   (b) at least one beam emitter disposed in the housing for illuminating the projectile as it passes through the housing;
   (c) at least one electronic imager disposed in the housing for viewing the projectiles that are illuminated by the emitter and for producing electronic signals representing images of the projectile;
   (d) an electronic computational logic device, coupled to said at least one electronic imager, for processing said signals to determine at least one flight parameter of the projectile that has passed through the housing, said projectile flight parameters being selected from the group consisting of:
      (1) projectile yaw;
      (2) projectile spin;
      (3) projectile muzzle velocity.

2. The apparatus recited in claim 1, wherein said logic device is further operative to determine projectile flight parameters selected from the group consisting of:
   (4) projectile rate of change of yaw;
   (5) projectile rate of change of spin; and
   (6) projectile rate of change of muzzle velocity.

3. The apparatus recited in claim 1, wherein said at least one emitter provides strobe illumination and said at least one imager captures stop-action views of the projectile.

4. The apparatus recited in claim 1, wherein said at least one emitter strobes the illumination and said at least one imager captures views of the projectile at the instants of the illumination as the projectile passes through the housing.

5. The apparatus recited in claim 1, wherein said at least one imager captures at least two successive views of the projectile as it passes through the housing.

6. The apparatus recited in claim 1, wherein said at least one imager captures views at different angles around a circumference of the projectile as it passes through the housing.

7. The apparatus recited in claim 1, wherein the projectile has a cylindrical body defining a central longitudinal axis and a plurality of markings arranged in a circular row around the body, with said row extending perpendicular to said longitudinal axis.

8. The apparatus recited in claim 7, wherein at least some of the projectile markings are colored.

9. The apparatus recited in claim 1, wherein the projectile comprises an explosive charge and a programmable device for detonating said explosive charge while projectile is in flight.

10. The apparatus recited in claim 1, wherein said at least one emitter emits a radiation beam, in particular at least one of IR, visible light and UV light.

11. The apparatus recited in claim 1, wherein said at least one emitter emits an ion beam.

12. The apparatus recited in claim 1, wherein said weapon includes an aiming device for the gun barrel, and wherein said logic device is coupled with said aiming device for adjusting the aim of the barrel in dependence upon said at least one flight parameter.

13. A weapon system for use with a weapon having a barrel with a muzzle for firing a programmable, airburst ammunition projectile toward a target said system comprising a measurement and programming device for measuring the velocity of the projectile as it transits and exits the muzzle and for programming the airburst time of the projectile after exiting the muzzle, said device including:
(1) a velocity measurement device configured to be disposed adjacent the muzzle of the weapon for measuring the muzzle velocity of said programmable projectile when fired from said barrel and for producing a signal representing said muzzle velocity;
(2) a ranging device for determining the range to the target and for producing a signal representing said target range;
(3) a ballistic calculator including a processor, coupled to receive said target range and muzzle velocity signals, for calculating an optimum flight duration to burst for said projectile in dependence upon the measured muzzle velocity and for producing a programming signal representing the airburst time of the projectile; and
(4) a transmitter, coupled to said ballistic calculator, for transmitting the programming signal to said airburst projectile after the projectile leaves the muzzle and is in flight toward the target.

14. The weapon system recited in claim 13, wherein said ballistic calculator calculates the time of flight of said airburst projectile to the target and the desired, optimum time to detonate said projectile.

15. The weapon system recited in claim 13, wherein said transmitter transmits an optical signal to the projectile.

16. The weaponry system recited in claim 13, wherein said transmitter transmits an radio frequency signal to the projectile.

17. The weapon system recited in claim 13, further including an input device, coupled to said ballistic calculator, for producing a signal representing a desired variation in the optimum airburst time of the projectile, whereby the calculator adjusts the programming signal in accordance with the variation.

18. The weapon system recited in claim 17, wherein said input device allows for a user to extend the desired time of flight by adding milliseconds to the duration of a projectile's flight before bursting, allowing for a projectile to travel past the target range determined by the ranging device by at least a meter, in a case where the projectile's fragmentation throw is optimized rearward and such variation in airburst time would optimize an effect on target.

19. The weapon system recited in claim 17, wherein said input device allows for a user to reduce the desired time of flight by subtracting milliseconds from the duration of a projectile's flight before bursting, causing the projectile to detonate at least a meter before the target range determined by the ranging device, in a case where the projectile's fragmentation throw is optimized for forward travel and such variation in airburst time would optimize an effect on target.

20. A weapon system for use with a weapon having a barrel with a muzzle for firing an ammunition projectile toward a target, said projectile having metallic characteristics upon which a magnetic force can be applied when in flight to slow or accelerate the projectile to a target velocity, said weapon system comprising a measurement and regulating device for measuring and regulating the velocity of a projectile as it transits and exits the barrel, said device including:
(1) a velocity measurement device configured to be disposed adjacent the muzzle of the barrel for measuring the muzzle velocity of said projectile;
(2) a ballistic calculator for calculating an electrical force to be applied to a projectile transiting coils in dependence upon the type of ammunition projectile;
(3) at least one magnetic coil configured to surround the projectile as it transits and exits the barrel for applying a magnetic force to slow or accelerate the projectile to a desired target velocity; and
(4) a source of electrical energy, coupled to said magnetic coil, for applying a current to said magnetic coil; and
(5) a controller, coupled to said calculator and to said source of energy, for controlling the amount of current applied to said magnetic coil in dependence upon the magnetic force required to slow or accelerate the projectile to the desired target velocity.

21. The measurement and regulating device defined in claim 20, wherein said ballistic calculator transmits information to an external fire control system.

22. The measurement and regulating device defined in claim 20, wherein said calculator includes a memory for storing said metallic characteristics of a plurality of projectiles, and input means, coupled to the calculator, for selecting the metallic characteristics of a projectile to be fired.

23. The measurement and regulating device defined in claim 20, further comprising an electrical storage device; wherein the magnetic coil transforms mechanical energy of the projectile into an electrical energy, thereby reducing the velocity of, and robbing mechanical energy from, the projectile, and wherein said electrical energy so generated is supplied to the storage device for powering the system.

* * * * *